(12) United States Patent
Emura et al.

(10) Patent No.: US 12,724,230 B2
(45) Date of Patent: Sep. 1, 2026

(54) IMAGING LENS AND IMAGING APPARATUS

(71) Applicant: Tamron Co., Ltd., Saitama (JP)

(72) Inventors: Hiroki Emura, Saitama (JP); Hiroyuki Hagiwara, Saitama (JP); Shingo Fuse, Saitama (JP)

(73) Assignee: TAMRON CO., LTD., Saitama (JP)

( * ) Notice: Subject to any disclaimer, the term of this patent is extended or adjusted under 35 U.S.C. 154(b) by 494 days.

(21) Appl. No.: 18/130,228

(22) Filed: Apr. 3, 2023

(65) Prior Publication Data

US 2023/0384559 A1 Nov. 30, 2023

(30) Foreign Application Priority Data

May 25, 2022 (JP) ................................ 2022-085182

(51) Int. Cl.
*G02B 9/62* (2006.01)

(52) U.S. Cl.
CPC ..................................... *G02B 9/62* (2013.01)

(58) Field of Classification Search
CPC ...... G02B 9/62; G02B 13/00; G02B 13/0045; G02B 13/18; G02B 13/06; G02B 1/00
See application file for complete search history.

(56) References Cited

U.S. PATENT DOCUMENTS

| | | | | |
|---|---|---|---|---|
| 10,901,183 | B2 * | 1/2021 | Yang | G02B 13/0045 |
| 11,262,553 | B2 * | 3/2022 | Chen | G02B 13/0045 |
| 11,921,261 | B1 * | 3/2024 | McMichael | H04N 23/54 |
| 2004/0080632 | A1 * | 4/2004 | Iwasawa | G02B 13/0045 348/335 |
| 2011/0096407 | A1 * | 4/2011 | Ohata | G02B 15/143507 359/689 |
| 2012/0120501 | A1 * | 5/2012 | Katayose | G02B 15/143507 359/689 |
| 2012/0147484 | A1 * | 6/2012 | Asami | G02B 13/004 359/753 |
| 2019/0154986 | A1 * | 5/2019 | Hagiwara | G02B 9/60 |
| 2021/0018727 | A1 * | 1/2021 | Hagiwara | G02B 9/60 |
| 2023/0333355 | A1 * | 10/2023 | Hsu | G02B 13/0045 |

FOREIGN PATENT DOCUMENTS

| | | | | |
|---|---|---|---|---|
| EP | 3220179 | B1 * | 3/2020 | G02B 13/002 |
| JP | 2016-126230 | A | 7/2016 | |
| JP | 2017-173807 | A | 9/2017 | |
| JP | 2021-533422 | A | 12/2021 | |

* cited by examiner

*Primary Examiner* — Christopher E Leiby
(74) *Attorney, Agent, or Firm* — Paratus Law Group, PLLC

(57) ABSTRACT

An imaging lens includes, in order from an object side to an image side, a first lens including a negative meniscus lens having a convex shape facing the object, a second lens including a positive meniscus lens having a convex shape facing the image, at least one lens including a third lens, a fourth lens, a fifth lens, and a sixth lens including a positive lens having a convex image side surface, and Expression (1) is satisfied as follows. Further, an imaging apparatus including the imaging lens is provided.

$$1.2 < D_2/f \tag{1}$$

where
$D_2$ is a thickness of the second lens on the optical axis, and
f is a focal length of the imaging lens.

17 Claims, 13 Drawing Sheets

SPHERICAL ABERRATION
Fno = 1.55
−0.10
0.0
0.10
(mm)
ASTIGMATISM
Ymax = 4.10
−0.10
0.0
0.10
(mm)
DISTORTION
Ymax = 4.10
−60
0.0
60
(%)

IMAGING LENS AND IMAGING APPARATUS

CROSS-REFERENCE TO RELATED APPLICATIONS

This application is based on and claims the benefit of priority from Japanese Patent Application No. 2022-085182, filed on May 25, 2022, the entire contents of which are incorporated herein by reference.

BACKGROUND OF THE INVENTION

Technical Field

The present invention relates to an imaging lens and an imaging apparatus, and more particularly to an imaging lens suitable for an imaging apparatus including a solid state image sensor such as a charge coupled device (CCD) sensor or a complementary metal oxide semiconductor (CMOS) sensor and an imaging apparatus.

Related Art

Various imaging apparatuses such as portable imaging apparatuses such as a single lens reflex camera, a mirrorless camera, and a digital still camera, and stationary imaging apparatuses such as a monitoring imaging apparatus and an in-vehicle imaging apparatus have been widely used. With the increase in the number of pixels of the solid state image sensor used in these devices, there is a demand for higher performance of the imaging lens.

In recent years, advanced driver assistance systems (ADAS) have begun to spread. In the ADAS, sensing is performed using an in-vehicle imaging apparatus, and various driving assistance is performed based on analysis of an image obtained by the imaging apparatus. An imaging apparatus used for the ADAS is required to have an imaging lens that has high resolving power, is small and lightweight, has a wide imaging range, and can acquire a bright subject image even under low illuminance such as in bad weather or at night. Furthermore, since such an imaging apparatus is required to have reliability that can withstand long-term use and is used in various environments, the imaging lens is required not only to have durability but also to be able to stably maintain good imaging performance regardless of a change in use environment.

As an imaging lens of an in-vehicle imaging apparatus, for example, JP 2016-126230 A discloses an imaging lens including, in order from an object side to an image side, a negative meniscus lens having a concave shape facing the image, a positive meniscus lens having a concave shape facing the object, a biconvex lens, an aperture stop, a lens group having negative combined refractive power, and a lens group having positive combined refractive power. According to the imaging lens, since a lens group having positive combined refractive power is configured by a lens disposed closer to the object than the aperture stop, low distortion is realized while having a relatively wide angle.

JP 2017-173807 A discloses an imaging lens including, in order from an object side to an image side, a negative lens having a convex shape facing the object near an optical axis, a positive meniscus lens having a convex shape facing the image, a positive lens, a cemented lens in which the positive lens and the negative lens are cemented, and a positive lens. In the imaging lens, the curvature radius and the center thickness of the negative lens located closest to the object are set to values within a predetermined range, thereby achieving high angular resolution near the optical axis center.

JP 2021-533422 A discloses an imaging lens including, in order from an object side to an image side, a negative lens having a convex shape facing the object, a negative lens, an aperture stop, a positive lens, a biconvex lens, a negative lens, and a positive lens. In the imaging lens, by defining the refractive power arrangement and disposing the aspherical lens in a predetermined arrangement, good imaging performance can be realized at a wide angle.

However, in the imaging lens disclosed in JP 2016-126230 A, since a lens group having positive combined refractive power closer to the object than the aperture stop is configured, a converged pencil of rays is incident on the aperture stop. Therefore, the imaging lens cannot secure a sufficient aperture stop diameter, and the brightness is insufficient. That is, the imaging lens has a large F number. JP 2016-126230 A discloses an example in which the F number is about 2.6, but considering that the in-vehicle imaging apparatus is used under low illuminance, the F number of the imaging lens is not sufficient, and it is necessary to use a brighter imaging lens (with a smaller F number) in order to obtain sufficient visibility to the subject. Further, the half angle of view of the imaging lens disclosed in JP 2016-126230 A is about 30 degrees. In order to use the imaging lens as an imaging lens of an imaging apparatus for in-vehicle sensing, it is necessary to realize a wider angle of view.

In the imaging lens disclosed in JP 2017-173807 A, in order to enhance the angular resolution near the optical axis, the curvature radius of the negative lens located closest to the object is reduced and the center thickness is increased. Therefore, it is difficult to obtain good optical performance, including the peripheral portion, and it is also difficult to miniaturize the imaging lens. Furthermore, the in-vehicle imaging apparatus is required to be small, and the lens, of the imaging lens, disposed closest to the object is required to be hardly visually recognized from the outside (object side/for example, outside the vehicle). That is, the imaging lens of the in-vehicle imaging apparatus has strict restrictions on the front lens diameter. In the imaging lens described in JP 2017-173807 A, since the refractive power of the lens disposed closest to the object is weak, it is difficult to reduce the front lens diameter to a level or less required for the imaging lens of the in-vehicle imaging apparatus.

In the imaging lens disclosed in JP 2021-533422 A, since only the negative lens is disposed closer to the object than the aperture stop, a lens group having negative refractive power having a strong divergence action is configured on the object side of the aperture stop. Therefore, the divergent pencil of rays is incident on the aperture stop. Therefore, a sufficient aperture stop diameter can be obtained, which is preferable for configuring an imaging lens having a small F number. In this case, it is also easy to reduce the front lens diameter. However, since the pencil of rays spreads before and after the aperture stop, it is difficult to reduce the diameter of the entire imaging lens, particularly the lens disposed closer to the image than the aperture stop.

Therefore, an object of the present invention is to provide an imaging lens and an imaging apparatus that are bright, have a wide imaging range, and have high imaging performance while achieving overall miniaturization.

SUMMARY OF THE INVENTION

In order to solve the above problems, an imaging lens according to the present invention includes, in order from an object side to an image side, a first lens including a negative meniscus lens having a convex shape facing the object, a second lens including a positive meniscus lens having a convex shape facing the image, at least one lens including a third lens, a fourth lens, a fifth lens, and a sixth lens including a positive lens whose image side surface is a convex surface, wherein Expression (1) is satisfied as follows:

$$1.2 < D_2/f \quad (1)$$

where $D_2$ is a thickness of the second lens on the optical axis, and f is a focal length of the imaging lens.

In order to solve the above problems, an imaging apparatus according to the present invention includes the imaging lens and an image sensor that converts an optical image formed by the imaging lens into an electrical signal.

According to the present invention, it is possible to provide an imaging lens and an imaging apparatus that are bright, have a wide imaging range, and have high imaging performance while achieving overall miniaturization.

BRIEF DESCRIPTION OF THE DRAWINGS

FIG. 7 is a lens cross-sectional view of an imaging lens according to Example 4 of the present invention;

DESCRIPTION OF THE EMBODIMENTS

Figure 1:
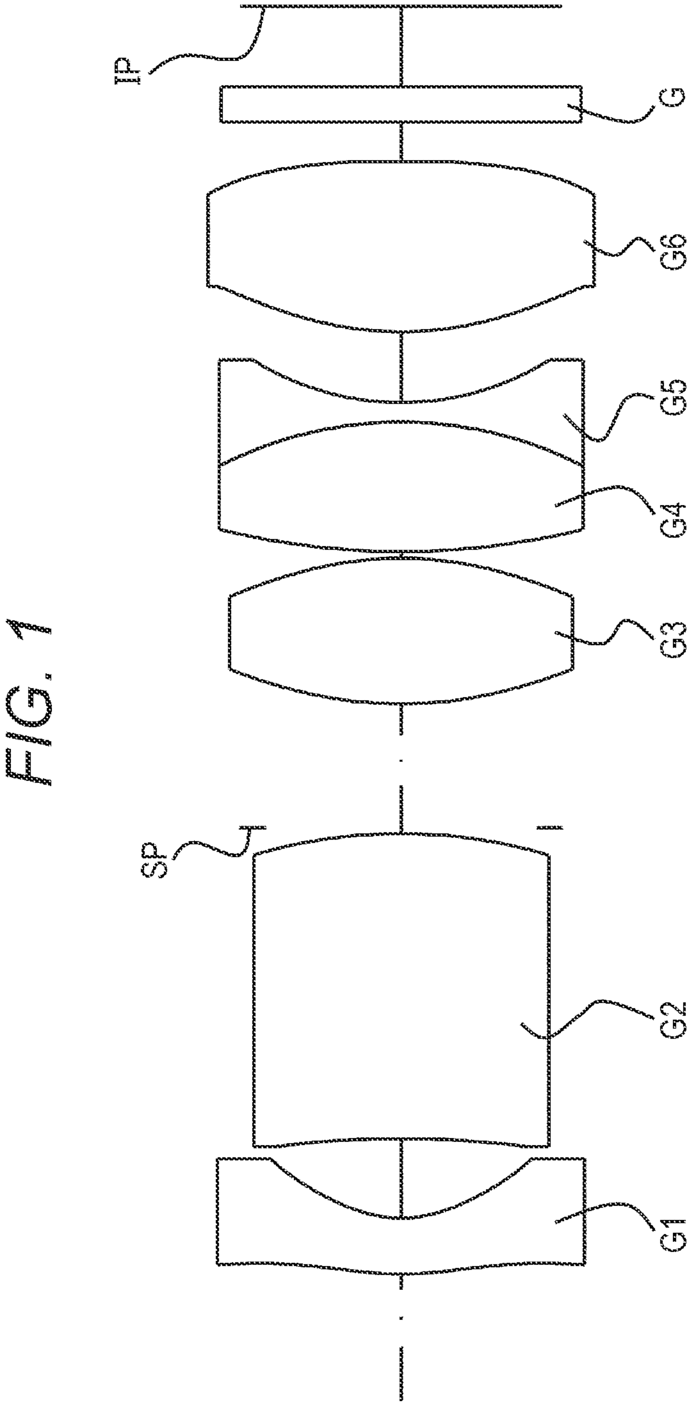
FIG. 1 is a lens cross-sectional view of an imaging lens according to Example 1 of the present invention.

Hereinafter, embodiments of an imaging lens and an imaging apparatus according to the present invention will be described. However, the imaging lens and the imaging apparatus described below are an aspect of the imaging lens and the imaging apparatus according to the present invention, and the imaging lens and the imaging apparatus according to the present invention are not limited to the following aspects.

1. Imaging Lens

1-1. Optical Configuration

The imaging lens includes, in order from an object side to an image side, a first lens including a negative meniscus lens having a convex shape facing the object, a second lens including a positive meniscus lens having a convex shape facing the image, at least one lens including a third lens, a fourth lens, a fifth lens, and a sixth lens including a positive lens having a convex image side surface. Note that the imaging lens is substantially composed of these lenses, but the imaging lens is allowed to include optical elements other than lenses such as lenses having substantially no refractive power and cover glasses, in addition to these lenses having substantially refractive power. Hereinafter, details will be described in order from the object side.

(1) First Lens

By using the negative lens as the first lens disposed closest to the object, it is easy to diverge the incident pencil of rays and realize a wide angle of view. In addition, it is possible to increase the aperture stop diameter while reducing the lens diameter of the first lens, that is, the front lens, and it is easy to reduce the F number. Furthermore, by making the first lens a negative meniscus lens having a convex shape facing the object, when a pencil of rays passing through the first lens is reflected on the image plane or in the lens barrel and reaches the first lens, it is possible to suppress occurrence of a ghost by light reflected by the first lens being incident on the image plane again. In addition, if the object side surface of the first lens is a concave surface, when a wide angle of view is to be realized, incident light is totally reflected by the object side surface of the first lens, and a desired angle of view may not be obtained. On the other hand, when the object side surface of the first lens is a convex surface as in the imaging lens, it is easy to realize a wider angle of view.

Here, the first lens preferably has at least one aspherical face. By making the object side surface or the image side surface of the first lens aspherical, in particular, field curvature from the optical axis center to the peripheral portion can be favorably corrected, and an imaging lens having favorable imaging performance can be configured with a small number of lenses. Furthermore, when the object side surface and the image side surface of the first lens are each aspherical, it is easy to measure the interplanar eccentricity. The amount of interplanar eccentricity refers to an eccentricity direction difference between the apex position of the object side surface of the first lens and the apex position of the image side surface of the first lens. That is, when an axis parallel to the optical axis is defined as a z axis and a plane perpendicular to the z axis is defined as an xy plane, the amount of interplanar eccentricity of the first lens refers to a shift amount of the apex position expressed by a difference between apex positions of the object side surface and the image side surface in the x axis direction and a difference in the y axis direction. Since the measurement of the amount of interplanar eccentricity is facilitated, the quality control of the first lens is facilitated, and occurrence of partial blur, eccentricity coma aberration, and the like due to the interplanar eccentricity can be suppressed.

(2) Second Lens

The second lens is a positive meniscus lens having a convex shape facing the image side. Therefore, the object side surface of the second lens is a concave surface. On the other hand, the image side surface of the first lens is a concave surface. Therefore, a biconvex air lens is formed between the first lens and the second lens. Since a divergence action of a pencil of rays can be obtained by the air lens, it is not necessary for only the first lens to have strong negative refractive power, and it is possible to obtain an imaging lens with high imaging performance by suppressing occurrence of various aberrations while realizing a wide angle of view.

In addition, since the second lens has positive refractive power, the pencil of rays diverged in the first lens can be converged by the second lens. Therefore, the imaging lens can be downsized while achieving a wide angle of view.

(3) Third Lens

In the imaging lens, whether the refractive power of the third lens is positive or negative, and a lens surface shape thereof is not particularly limited. For example, when the third lens has positive refractive power, the pencil of rays incident from the second lens can be converged, and the entire imaging lens can be downsized, which is preferable. In the imaging lens, since the second lens has positive refractive power, when the third lens has positive refractive power, the second lens and the third lens can have dispersedly positive refractive power. Therefore, it is possible to suppress excessive eccentricity sensitivity of the second lens, and is preferable for improving the yield.

When the third lens is a positive lens, the third lens is more preferably a biconvex lens. When the object side surface and the image side surface are convex surfaces, both surfaces can have dispersedly positive refractive power, and even when the third lens has relatively strong positive refractive power, occurrence of various aberrations is suppressed, and good imaging performance can be easily obtained.

On the other hand, when the third lens has negative refractive power, chromatic aberration can be corrected favorably. At this time, in a case where the imaging lens is further downsized, it is necessary for the second lens to have strong positive refractive power. However, when the second lens has strong positive refractive power, it is difficult to correct various aberrations. Therefore, when the third lens has negative refractive power, it is preferable to arrange a lens having positive refractive power between the third lens and the fourth lens to weaken the positive refractive power of the second lens.

When the third lens is a positive lens, by disposing one positive lens between the third lens and the fourth lens, positive refractive power can be dispersedly disposed, and occurrence of various aberrations can be suppressed. When the third lens is a positive lens, the chromatic aberration can be favorably corrected by disposing one negative lens between the third lens and the fourth lens. Furthermore, a similar effect can be obtained in a case where two or more lenses are disposed between the third lens and the fourth lens. As described above, one or more lenses may be disposed between the third lens and the fourth lens. In order to miniaturize the imaging lens, it is preferable that the number of lenses having substantially refractive power provided between the third lens and the fourth lens is up to one. That is, the imaging lens is preferably composed of six or seven lenses.

(4) Fourth Lens

In the imaging lens, whether the refractive power of the fourth lens is positive or negative, and a lens surface shape thereof is not particularly limited, but the fourth lens is preferably a positive lens. When the fourth lens is a positive lens, the pencil of rays can be further converged on the image side of the imaging lens, and the entire imaging lens can be downsized, which is preferable.

(5) Fifth Lens

In the imaging lens, whether the refractive power of the fifth lens is positive or negative, and a lens surface shape thereof is not particularly limited. However, in order to favorably correct the chromatic aberration, it is preferable that the refractive power of the fifth lens has a sign opposite to the refractive power of the fourth lens. In a case where the fourth lens has positive refractive power, chromatic aberration correction can be performed favorably when the fifth lens has negative refractive power.

Preferably, the fourth lens is a positive lens and the fifth lens is a negative lens in order to favorably correct chromatic aberration. Compared with the case of the opposite refractive power arrangement, the chromatic aberration can be corrected favorably. Preferably, the fourth lens and the fifth lens are cemented and integrated. When the fourth lens and the fifth lens are a cemented lens, arrangement adjustment such as optical axis alignment of lenses at the time of manufacturing the imaging lens is facilitated, and eccentricity sensitivity can be lowered. In this case, the combined refractive power of the cemented lens is preferably negative. When the cemented lens has a divergence action, it is possible to make the imaging lens compact, and to make the effective image circle large by raising the light beam to a desired image height on the image plane side.

(6) Sixth Lens

The sixth lens is a lens disposed substantially closest to the image in the imaging lens, and is constituted by a positive lens having a convex image side surface. Since the image side surface is a convex surface, when the pencil of rays reflected on the image plane is incident on the image side surface of the sixth lens, the re-reflected light can be prevented from being incident on the image plane. That is, by directing the re-reflected light to the outside of the image plane, the occurrence of a ghost can be suppressed. When the object side surface of the sixth lens is a convex surface, the pencil of rays raised by the fifth lens can be converged on the incident face of the sixth lens. In addition, positive refractive power can be dispersed on the object side surface and the image side surface of the sixth lens, and occurrence of various aberrations can be suppressed.

(7) Lens Glass Material

It is preferable that all the lenses from the first lens to the sixth lens constituting the imaging lens are made of glass. The glass lens has higher thermal stability and a smaller degree of expansion and contraction due to a change in ambient temperature than the plastic lens. Therefore, when all the lenses constituting the imaging lens are glass lenses, it is possible to favorably suppress a change in focus (focal position) and a change in angle of view even when the ambient temperature changes.

(8) Aperture Stop

In the imaging lens, an arrangement place of the stop (aperture stop) is not particularly limited. However, by disposing the stop at an appropriate position, it is possible to obtain a bright imaging lens having a small F number while cutting unnecessary light of the peripheral image height. Here, the stop defines a pupil position. In the imaging lens, the lens diameter of the first lens can be made smaller as the entrance pupil position is closer to the object. On the other hand, the closer the exit pupil position is to the image plane, the more this contributes to downsizing of the imaging lens. However, as the exit pupil position is closer to the image plane of the imaging lens, the incident angle of the imaging light with respect to the image plane is larger, and it is difficult for the light to appropriately enter the photodiode disposed in the image sensor. As a result, it is difficult to ensure proper exposure, so that sensitivity unevenness (shading unevenness) and peripheral coloring occur. Therefore, from the viewpoint of brightness, and suppressing of sensitivity unevenness, peripheral coloring, and the like, the stop is preferably disposed closer to the object than the fourth lens, more preferably disposed between the second lens and the fourth lens, and most preferably disposed between the second lens and the third lens.

1-2. Expression

The optical system preferably satisfies one or more of the following Expressions.

1-2-1. Expression (1)

$$1.2 < D_2/f \quad (1)$$

where $D_2$ is a thickness of the second lens on the optical axis, and f is a focal length of the imaging lens.

Expression (1) defines a ratio between the thickness (center thickness) of the second lens on the optical axis and the focal length of the imaging lens. In a case where Expression (1) is satisfied, it is possible to favorably correct the chromatic aberration of magnification while maintaining the imaging lens small in size, and it is possible to obtain an imaging lens having good imaging performance. In addition, it is also effective in reducing the lens diameter of the first lens to a level or less required for the imaging lens of the in-vehicle imaging apparatus.

On the other hand, in a case where the numerical value of Expression (1) is equal to or less than the lower limit value, in the imaging lens of the in-vehicle imaging apparatus, when the thickness of the second lens is thin, it is difficult for the second lens to have desired positive refractive power, and it is difficult to achieve miniaturization of the imaging lens in the radial direction while achieving a wide angle of view, which is not preferable.

In order to obtain the above effect, the lower limit value of Expression (1) is more preferably 1.25 and still more preferably 1.35. In addition, the upper limit value of Expression (1) is not particularly limited, but when the thickness of the second lens is too thick, it may be difficult to obtain good imaging performance while reducing the size of the imaging lens. Therefore, the upper limit value of Expression (1) is, for example, preferably 5.0, and more preferably 2.0. However, in Expression (1), an inequality sign (<) may be replaced with an inequality sign with an equality sign (≤). The upper limit value may be an inequality sign with an equal sign (≤) or an inequality sign (<). The same applies to other Expressions.

1-2-2. Expression (2)

$$-10.0 < f_{12}/f < 0 \quad (2)$$

where $f_{12}$ is a composite focal length of the first lens and the second lens.

Expression (2) defines a ratio between the composite focal length of the first lens and the second lens and the focal length of the imaging lens. When Expression (2) is satisfied, the composite focal length of the first lens and the second lens is negative, and the back focus of the imaging lens, that is, the distance (an air conversion length) between the sixth lens and the image plane on the optical axis can be increased. In this case, it is easy to arrange an optical block such as a crystal low-pass filter or an infrared cut filter between the sixth lens and the image plane. In addition, in a case where the composite focal length of the first lens and the second lens falls within the range of Expression (2), astigmatism correction is improved, and an imaging lens with higher imaging performance can be obtained.

On the other hand, when the numerical value of Expression (2) is equal to or less than the lower limit value, the negative combined refractive power of the first lens and the second lens is too weak, and in order to obtain an imaging lens having a small F number and excellent imaging performance, it is necessary to increase the lens diameter of the first lens, which is not preferable in terms of miniaturization of the imaging lens. On the other hand, when the value of Expression (2) is equal to or more than the upper limit value, that is, when $f_{12}$ indicates a positive value, in order to obtain an imaging lens having a small F number and excellent imaging performance, it is not preferable in this case because it is necessary to increase the lens diameter of the first lens.

In order to obtain the above effect, the lower limit value of Expression (2) is more preferably −5.0 and still more preferably −3.6. As the value of Expression (2) increases within the above range, the negative combined refractive power of the first lens and the second lens increases, which is preferable for reducing the lens diameter of the first lens. However, when the negative combined refractive power is too strong, it may be difficult to correct various aberrations such as field curvature. From this viewpoint, the upper limit value of Expression (2) is more preferably −1.0 and still more preferably −1.6.

1-2-3. Expression (3)

$$0.05 < D_1/f < 0.6 \quad (3)$$

where $D_1$ is a thickness of the first lens on the optical axis.

Expression (3) defines a ratio between the thickness of the first lens on the optical axis and the focal length of the imaging lens. When Expression (3) is satisfied, the curvature of the first lens can be set within an appropriate range while securing a thickness capable of maintaining the durability of the first lens. Therefore, it is easier to reduce the diameter of the first lens to a level or less required for the imaging lens of the in-vehicle imaging apparatus while disposing the first lens having sufficient negative refractive power, and suppressing the occurrence of various aberrations.

On the other hand, when the numerical value of Expression (3) is equal to or less than the lower limit value, the thickness of the first lens is too thin, and it is difficult to maintain durability. On the other hand, when the numerical value of Expression (3) is equal to or more than the upper limit value, the thickness of the first lens is too thick, and it is difficult for the first lens to have sufficient negative refractive power, or the lens diameter of the first lens is large, which is not preferable from the viewpoint of downsizing the imaging lens.

In order to obtain the above effect, the lower limit value of Expression (3) is more preferably 0.1 and still more preferably 0.2. The upper limit value of Expression (3) is more preferably 0.5 and still more preferably 0.4.

1-2-4. Expression (4)

$$0.1 < d_{1-2}/f < 2.0 \quad (4)$$

where $d_{1-2}$ is an air distance between the first lens and the second lens on the optical axis.

Expression (4) defines a ratio between the air distance between the first lens and the second lens on the optical axis and the focal length of the imaging lens. A value of "$d_{1-2}$" corresponds to a thickness (distance between faces) of the air lens formed between the first lens and the second lens. When Expression (4) is satisfied, various aberrations can be favorably corrected by the air lens, and an imaging lens having high imaging performance can be obtained. In addition, when Expression (4) is satisfied, the air distance between the first lens and the second lens on the optical axis falls within an appropriate range, and the light can be incident on the second lens before the diameter of the pencil of rays diverged in the first lens is too large. Therefore, the imaging lens can be more easily downsized.

On the other hand, when the numerical value of Expression (4) is equal to or more than the upper limit value, it is necessary to increase the lens diameter of the second lens, and the overall optical length also increases. Therefore, it is not preferable to reduce the size of the imaging lens. On the other hand, when the numerical value of Expression (4) is equal to or less than the lower limit value, the divergence action by the air lens cannot be sufficiently obtained, it is difficult to correct various aberrations, and it is difficult to obtain good imaging performance.

In order to obtain the above effect, the lower limit value of Expression (4) is more preferably 0.2 and still more preferably 0.3. The upper limit value of Expression (4) is more preferably 1.0 and still more preferably 0.6.

1-2-5. Expression (5)

$$0.5 < R_{11}/f < 10.0 \quad (5)$$

where $R_{11}$ is a paraxial curvature radius of the object side surface of the first lens.

Expression (5) defines a ratio between the paraxial curvature radius of the object side surface of the first lens and the focal length of the imaging lens. When Expression (5) is satisfied, the shape of the object side surface of the first lens is a more appropriate convex shape in suppressing the occurrence of a ghost.

On the other hand, when the numerical value of Expression (5) is equal to or less than the lower limit value, the paraxial curvature radius of the object side surface of the first lens is too small, it is difficult to suppress the occurrence of various aberrations such as coma aberration and field curvature, and it is difficult to obtain good imaging performance with a small number of lenses, which is not preferable. On the other hand, when the numerical value of Expression (5) is equal to or more than the upper limit value, the object side surface of the first lens is close to a plane, and it is difficult to suppress the occurrence of ghost, which is not preferable.

In order to obtain the above effect, the lower limit value of Expression (5) is more preferably 0.8 and still more preferably 1.0. The upper limit value of Expression (5) is more preferably 5.0 and still more preferably 2.0.

1-2-6. Expression (6)

$$0.25 < D_3/f < 2.0 \quad (6)$$

where $D_3$ is a thickness of the third lens on the optical axis.

Expression (6) defines a ratio between the thickness of the third lens on the optical axis and the focal length of the imaging lens. In a case where Expression (6) is satisfied, it is possible to reduce the size in the overall optical length direction and to favorably correct various aberrations such as the spherical aberration and the chromatic aberration of magnification, and it is possible to obtain an imaging lens with better imaging performance.

On the other hand, when the numerical value of Expression (6) is equal to or less than the lower limit value, it is difficult to correct the spherical aberration and the chromatic aberration of magnification, which is not preferable. On the other hand, when the numerical value of Expression (6) is equal to or more than the upper limit value, the thickness of the third lens is thick, which is not preferable in reducing the size of the imaging lens.

In order to obtain the above effect, the lower limit value of Expression (6) is more preferably 0.35 and still more preferably 0.50. The upper limit value of Expression (6) is more preferably 1.0 and still more preferably 0.95.

1-2-7. Expression (7)

$$0 < d_{5-6}/f < 1.5 \quad (7)$$

where $d_{5-6}$ is an air distance between the fifth lens and the sixth lens on the optical axis.

Expression (7) defines a ratio between the air distance between the fifth lens and the sixth lens on the optical axis and the focal length of the imaging lens. In a case where Expression (7) is satisfied, the overall optical length of the imaging lens is shortened, and the light beam height of the incident light with respect to the sixth lens can be raised to a desired image height, while the imaging lens is downsized and the effective image circle can be enlarged, which is preferable.

On the other hand, when the numerical value of Expression (7) is equal to or less than the lower limit value, the overall optical length is short, but it is difficult to raise the light beam up to a desired image height, and the effective image circle cannot be enlarged, which is not preferable. On the other hand, when the numerical value of Expression (7) is equal to or more than the upper limit value, the overall optical length is long, which is not preferable in reducing the size of the imaging lens.

In order to obtain the above effect, the lower limit value of Expression (7) is more preferably 0.05 and still more preferably 0.13. The upper limit value of Expression (7) is more preferably 1.0 and still more preferably 0.7.

1-2-8. Expression (8)

$$2.0 < TTL/f < 10.0 \quad (8)$$

where

TTL is a distance from the object side surface of the first lens to the image plane on the optical axis, and a value converted into air is used as the distance from the sixth lens to the image plane on the optical axis.

Expression (8) defines a ratio between the distance from the object side surface of the first lens to the image plane on the optical axis, that is, the overall optical length, and the focal length of the imaging lens. In a case where Expression (8) is satisfied, the overall optical length of the imaging lens is shorter than the focal length, and it is easier to obtain an imaging lens having high imaging performance in which various aberrations are favorably corrected while reducing the size of the imaging lens.

In order to obtain the above effect, the lower limit value of Expression (8) is more preferably 3.0 and still more preferably 4.0. The upper limit value of Expression (8) is more preferably 9.0 and still more preferably 8.0.

1-2-9. Expression (9)

$$0.2 < BF/f < 2.0 \quad (9)$$

where

BF is a distance converted into air from the image side surface of the sixth lens to the image plane on the optical axis.

Expression (9) defines a ratio between the distance from the image side surface of the sixth lens to the image plane on the optical axis and the focal length of the imaging lens. When Expression (9) is satisfied, it is easy to install an optical block such as a crystal low-pass filter or an infrared cut filter between the sixth lens and the image plane while suppressing an increase in the overall optical length of the imaging lens.

In order to obtain the above effect, the lower limit value of Expression (9) is more preferably 0.4 and still more preferably 0.5. The upper limit value of Expression (9) is more preferably 1.7 and still more preferably 1.2.

1-2-10. Expression (10)

$$90° < FOV \quad (10)$$

where

FOV is an angle of view of the imaging lens.

Expression (10) defines an angle of view of the imaging lens. When Expression (10) is satisfied, it is possible to obtain an imaging lens having high angular resolution in the vicinity of the paraxial direction while securing a wide angle of view. Therefore, it is possible to form an image of a far object with high resolution, and it is possible to obtain an imaging lens having a wider angle of view than an imaging lens having a similar focal length. Therefore, by applying the imaging lens to the imaging optical system of the sensing camera and performing sensing ahead of the vehicle in the traveling direction, it is possible to detect a far object such as a preceding vehicle with high accuracy while widely recognizing an object (obstacle, signal, road traffic sign, etc.) around the vehicle.

In order to obtain the above effect, the lower limit value of Expression (10) is more preferably 100° and still more preferably 110°. The upper limit value of Expression (10) is not particularly limited, but may be, for example, 180°.

1-2-11. Expression (11)

$$40 < \nu_3 \quad (11)$$

where $\nu_3$ is an Abbe number of the third lens with respect to d Line.

Expression (11) defines an Abbe number of the third lens with respect to d Line. When Expression (11) is satisfied, the longitudinal chromatic aberration can be favorably reduced, and the imaging lens with higher imaging performance can be obtained.

In order to obtain the above effect, the lower limit value of Expression (11) is more preferably 45. The upper limit value of Expression (11) is not particularly limited, but is, for example, preferably 80, and more preferably 70.

1-2-12. Expression (12)

$$1.0 < f_3/f < 5.0 \quad (12)$$

where $f_3$ is a focal length of the third lens.

Expression (12) defines a ratio between the focal length of the third lens and the focal length of the imaging lens. In a case where Expression (12) is satisfied, the third lens has positive refractive power, and the pencil of rays can be converged in the third lens. Therefore, it is easy to reduce the diameters of the lenses constituting the imaging lens, particularly the fourth lens, the fifth lens, and the sixth lens. In addition, in a case where Expression (12) is satisfied, the positive refractive power of the third lens falls within an appropriate range, and it is easier to miniaturize the imaging lens while particularly suppressing the occurrence of spherical aberration.

On the other hand, when the numerical value of Expression (12) is equal to or less than the lower limit value, the positive refractive power of the third lens is too strong, it is difficult to correct various aberrations such as spherical aberration, and it is difficult to obtain an imaging lens having good imaging performance. On the other hand, when the numerical value of Expression (12) is equal to or more than the upper limit value, the positive refractive power of the third lens is too weak, which is not preferable in reducing the size of the imaging lens.

In order to obtain the above effect, the lower limit value of Expression (12) is more preferably 1.25 and still more preferably 1.4. The upper limit value of Expression (12) is preferably 4.0, and more preferably 2.8.

1-2-13. Expression (13)

$$(Y_{max} - f \times \tan\theta)/(f \times \tan\theta) < -0.3 \quad (13)$$

where $Y_{max}$ is an image height in an effective image circle, and $\theta$ is a half angle of view in the effective image circle.

In a case where Expression (13) is satisfied, large negative distortion can be generated, compared with that in a normal imaging lens, and it is easy to obtain an imaging lens having high angular resolution in the vicinity of the paraxial direction while securing a wide angle of view.

The smaller the numerical value of Expression (13), the larger the negative distortion, which is preferable for obtaining the above effect. From this viewpoint, the lower limit value of Expression (13) is not particularly limited. However, as the negative distortion increases, it is difficult to recognize an object reflected in the peripheral portion. From this viewpoint, the lower limit value of Expression (13) can be set to, for example, −0.7, and is more preferably −0.6. On the other hand, as described above, since a smaller numerical value of Expression (13) is more preferable, the upper limit value of Expression (13) is more preferably −0.35 and still more preferably −0.40.

1-2-14. Expression (14),

When the fourth lens is a positive lens and the fifth lens is a negative lens, Expression (14) is preferably satisfied as follows:

$$f_{45}/f<-1.0 \quad (14)$$

where $f_{45}$ is a composite focal length of the fourth lens and the fifth lens.

Expression (14) defines a ratio between the composite focal length of the fourth lens and the fifth lens and the focal length of the imaging lens. When Expression (14) is satisfied, since the divergence action of the pencil of rays can be obtained by the fourth lens and the fifth lens, the pencil of rays height can be raised to the image height to enlarge the effective image circle. Furthermore, when Expression (14) is satisfied, it is easy to suppress the occurrence of field curvature and to obtain an imaging lens with higher imaging performance.

The lower limit value of Expression (14) is not particularly limited, but for example, is preferably −50.0, and more preferably −15.0. In addition, the upper limit value of Expression (14) is more preferably −1.3 and still more preferably −2.0.

2. Imaging Apparatus

Next, the imaging apparatus according to the present invention will be described. The imaging apparatus according to the present invention includes an imaging lens according to the present invention and an image sensor that converts an optical image formed by the imaging lens into an electrical signal. Note that the image sensor is preferably provided on the image side of the optical system.

Here, the image sensor and the like are not particularly limited, and a solid state image sensor such as a charge coupled device (CCD) sensor or a complementary metal oxide semiconductor (CMOS) sensor can also be used. The imaging apparatus according to the present invention is suitable for an imaging apparatus including the solid state image sensors such as a digital camera and a video camera. Furthermore, the imaging apparatus can be applied to various imaging apparatuses such as a single lens reflex camera, a mirrorless camera, a digital still camera, a monitoring camera, an in-vehicle camera, and a camera mounted on a drone. Furthermore, these imaging apparatuses may be lens interchangeable imaging apparatuses, or may be lens fixed imaging apparatuses in which a lens is fixed to a housing. Specifically, the imaging lens is suitable for an optical system of an imaging apparatus mounted on a moving body such as a vehicle. Furthermore, since the imaging lens has a wide angle of view, it is possible to acquire a lot of information necessary for performing movement by self-contained navigation, monitoring of the surroundings, and the like on one image. Furthermore, in the imaging lens, since the image resolution in the vicinity of the optical axis is high, the imaging apparatus is suitable for a sensing camera mounted on a vehicle or the like, and performing sensing ahead of a moving body such as a vehicle in the traveling direction makes it possible to detect a far object such as a preceding vehicle with high accuracy while widely recognizing surrounding objects (obstacle, signal, road traffic sign, etc.).

Furthermore, in the imaging apparatus, light received by the solid state image sensor is photoelectrically converted and output as an electrical signal, and a digital image corresponding to an image of a subject is generated. The digital image can be recorded on a recording medium such as a hard disk device (HDD), a memory card, an optical disk, or a magnetic tape. When the imaging apparatus is a silver halide film camera, a film surface may be used as an image plane instead of the solid state image sensor.

Figure 13:
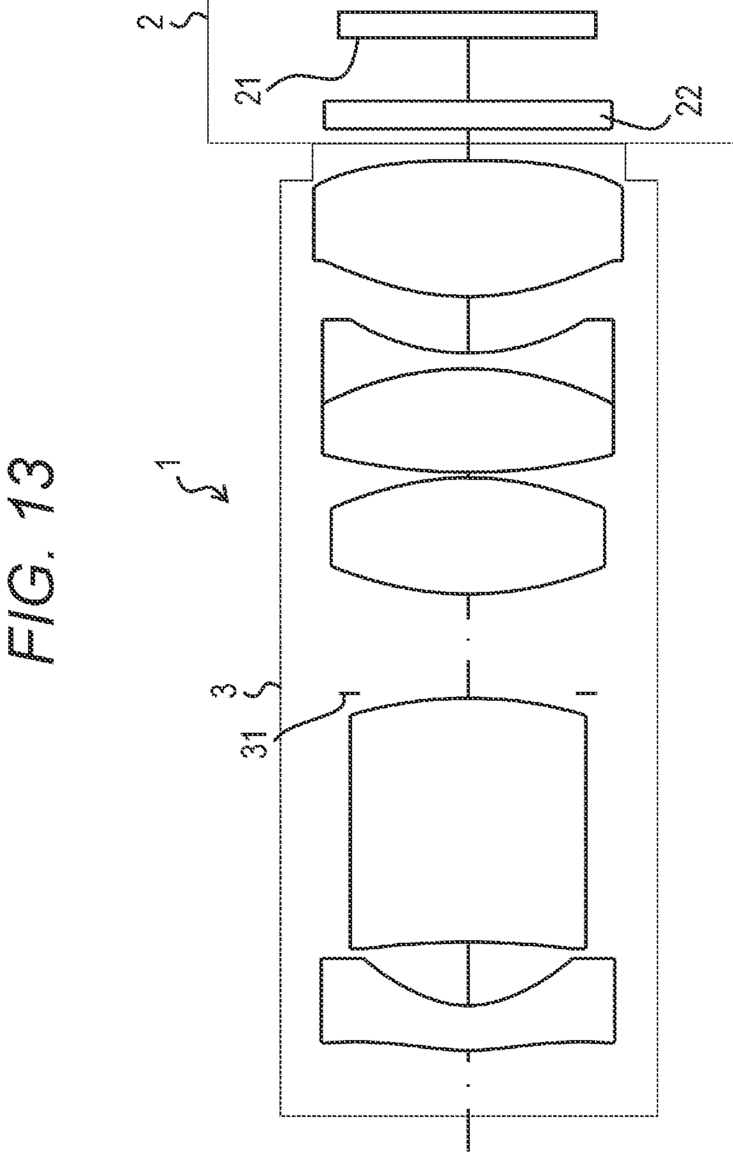
FIG. 13 is a diagram schematically illustrating an example of a configuration of an imaging apparatus according to an embodiment of the present invention.

FIG. 13 is a diagram schematically illustrating an example of a configuration of an imaging apparatus 1. A camera 2 includes a detachable imaging lens 3, an image sensor 21 disposed on an imaging plane IP of the imaging lens 3, and a cover glass 22 disposed closer to the object than the image sensor 21. The imaging lens 3 includes an aperture stop 31.

Next, the present invention will be specifically described with reference to examples. However, the present invention is not limited to the following examples.

Example 1

(1) Optical Configuration

FIG. 1 is a lens cross-sectional view of an imaging lens according to Example 1 of the present invention. As illustrated in FIG. 1, the imaging lens includes, in order from an object side to an image side, a first lens G1 including a negative meniscus lens having a convex shape facing the object, a second lens G2 including a positive meniscus lens having a convex shape facing the image, a third lens G3 including a biconvex lens, a cemented lens obtained by cementing a fourth lens G4 including a biconvex lens and a fifth lens G5 including a biconcave lens, and a sixth lens G6 including a biconvex lens. An aperture stop SP is disposed between the second lens G2 and the third lens G3. Both surfaces of the first lens G1, both surfaces of the third lens G3, and both surfaces of the sixth lens G6 are aspherical.

An optical block G is disposed between the sixth lens G6 and an image plane IP. The optical block G corresponds to an optical filter, a faceplate, a crystal low-pass filter, an infrared cut filter, or the like. The image plane IP is, for example, an imaging face of a solid state image sensor such as a CCD sensor or a CMOS sensor, a film surface of a silver halide film, or the like. These matters are the same as those in other examples, and thus the description thereof will be omitted below.

(2) Numerical Examples

Next, numerical examples of the imaging lens will be described. Hereinafter, surface data, specifications, and aspherical coefficients of the imaging lens will be described.

In the "surface data", the lens surface of the lens located closest to the object among the lenses constituting the imaging lens is set as the first lens surface, and the number of the lens surface sequentially increasing toward the image plane is indicated as a surface number. "r" indicates a radius of curvature [mm] of the lens surface corresponding to each surface number (however, the surface in which the value of r is INF indicates that the surface is a flat face). "d" indicates an axial distance [mm] between the lens surface of the surface number i (i is a natural number) and the lens surface of the surface number i+1. "nd" indicates a refractive index of each lens with respect to d Line (wavelength: 587.56 nm). "νd" indicates an Abbe number of each lens with respect to d Line (wavelength: 587.56 nm). However, when the lens surface is an aspherical face, "*" is added ahead of the surface number in the table. In addition, in the case of an aspherical face, the paraxial curvature radius is indicated in the column of "r".

In the "aspherical coefficient", the surface number of the lens surface that is an aspherical face and the aspherical coefficient thereof are indicated. Note that, in the aspherical shape, displacement z in the optical axis direction at a position at a distance h from the optical axis can be expressed by the following aspherical expression as an apex point reference.

$$z = ch^2/\left[1+\left\{1-(1+k)c^2h^2\right\}^{1/2}\right] + A4h^4 + A6h^6 + A8h^8 + A10h^{10} \ldots$$

where c is a curvature (1/r), h is a height from the optical axis, k is a conic coefficient (conic constant), and A4, A6, A8, A10, . . . are aspherical coefficients of each order. Note that the notation "E±m" (m represents an integer.) in the numerical values of the aspherical coefficient and the conic constant means "$\times 10^{\pm m}$".

"Specifications" indicate a focal length (f) [mm], an F number, a half angle of view (θ) [° ], an image height [mm], an overall optical length (TTL) [mm], and a back focus (BF) [mm] of the imaging lens. The overall optical length is a value obtained by adding back focus (BF) to the distance from the object side surface of the first lens G1 to the image side surface of the sixth lens G6 on the optical axis. In addition, the back focus (BF) is a value obtained by air-converting the distance from the final lens surface to the paraxial image plane.

Further, the values of Expression (1) to (14) are shown in Table 1 (shown below). Since the matters related to these numerical values are the same in other examples, the description thereof will be omitted below.

Figure 2:
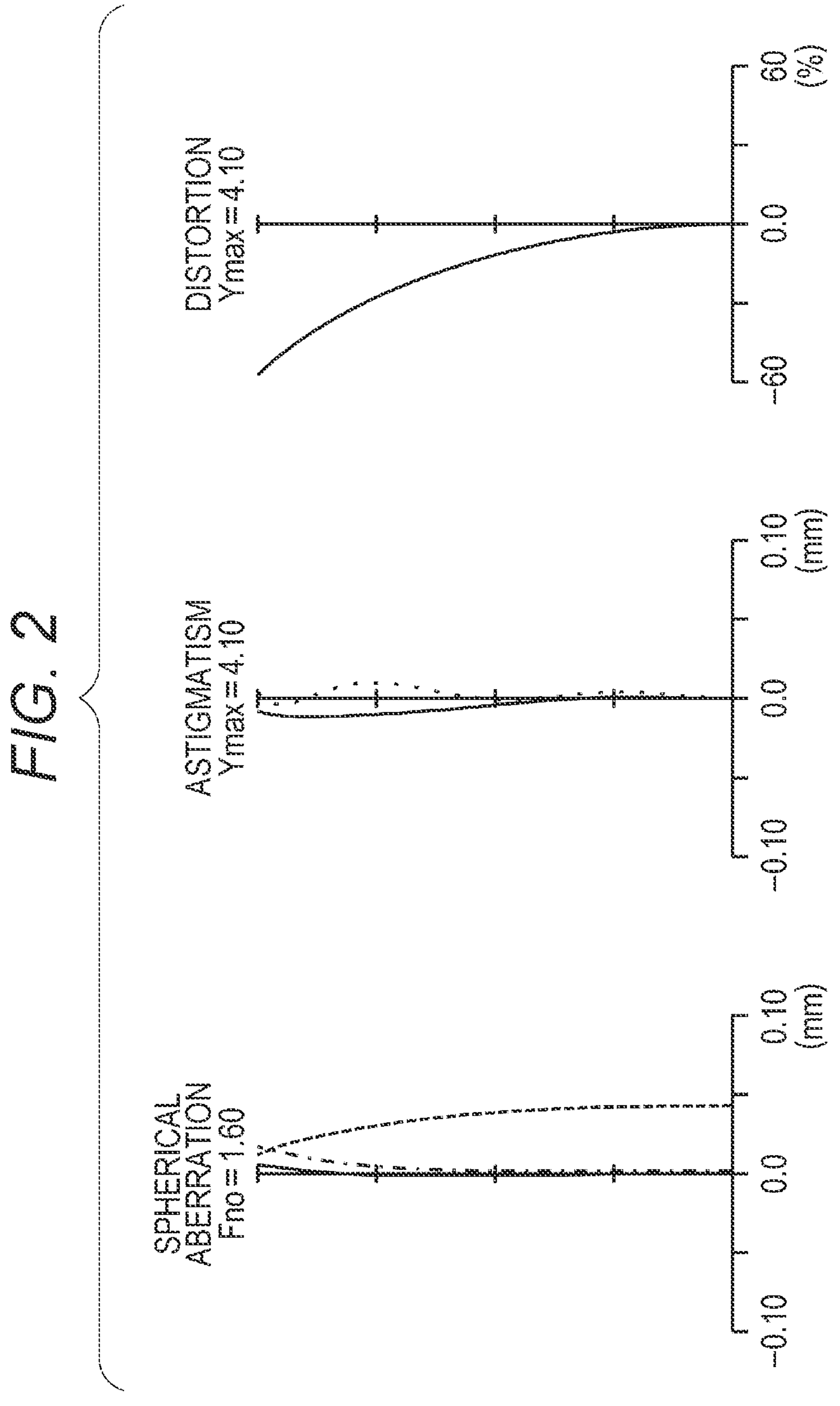
FIG. 2 is a spherical aberration diagram, an astigmatism diagram, and a distortion diagram of the imaging lens of Example 1 in an infinite-distance object focusing state.

FIG. 2 is longitudinal aberration diagrams of the imaging lens in an infinite-distance object focusing state. In each longitudinal aberration diagram, the spherical aberration, the astigmatism, and the distortion are illustrated in order from the left when viewing facing the drawing. In the diagram representing the spherical aberration, the vertical axis represents the ratio to the open F number (Fno), and the horizontal axis represents the defocusing. The solid line represents the spherical aberration with respect to d Line (wavelength λ=587.56 nm), the dash-dot line represents the spherical aberration with respect to the C line (wavelength Δ=656.28 nm), and the broken line represents the spherical aberration with respect to the F line (wavelength λ=486.13 nm). In the diagram representing astigmatism, the vertical axis represents the maximum image height (Ymax), the horizontal axis represents defocusing, the solid line represents a sagittal image plane with respect to d Line, and the dotted Line represents a meridional image plane with respect to d Line. In the diagram representing the distortion, the vertical axis represents the maximum image height (Ymax), and the horizontal axis represents the distortion [%]. The solid line represents the distortion [%]. The same applies to the longitudinal aberration diagrams illustrated in other examples, and thus the description thereof will be omitted below.

(Surface Data)

| Surface number | r | d | nd | νd |
|---|---|---|---|---|
| *1 | 8.254 | 1.420 | 1.8513 | 40.10 |
| *2 | 3.015 | 2.027 | | |
| 3 | −25.610 | 7.760 | 1.9037 | 31.32 |
| 4 | −13.140 | 0.150 | | |
| 5SP | INF | 3.152 | | |
| *6 | 10.353 | 3.710 | 1.6188 | 63.86 |
| *7 | −8.981 | 0.169 | | |
| 8 | 19.200 | 3.300 | 1.6180 | 63.40 |
| 9 | −10.100 | 0.500 | 1.8052 | 25.46 |
| 10 | 7.140 | 1.801 | | |
| *11 | 8.673 | 4.340 | 1.5920 | 67.02 |
| *12 | −34.391 | 1.000 | | |
| 13 | INF | 0.900 | 1.5168 | 64.20 |
| 14 | INF | 2.047 | | |

(Aspherical coefficient)

| Surface number | k | A4 | A6 | A8 | A10 |
|---|---|---|---|---|---|
| 1 | −1.2019E+00 | −5.1799E−03 | 2.2066E−04 | −4.9612E−06 | 4.6742E−08 |
| 2 | −2.5679E+00 | 4.0899E−04 | −1.1579E−05 | 1.1385E−05 | −3.3286E−07 |
| 6 | 0.0000E+00 | −2.0858E−04 | −5.5269E−07 | −6.4224E−09 | −7.7140E−10 |
| 7 | 0.0000E+00 | 4.3443E−04 | −1.8653E−06 | 5.3720E−08 | −1.3991E−09 |
| 11 | 0.0000E+00 | −1.9662E−04 | − 6.2925E−06 | −4.3212E−08 | −8.3966E−09 |
| 12 | 0.0000E+00 | −9.6135E−04 | 1.8180E−05 | −6.0126E−07 | 1.7294E−09 |

(Specifications)

| | |
|---|---|
| Focal length [mm] | 5.120 |
| F number | 1.60 |
| Half Angle of View [°] | 61.94 |
| Image height [mm] | 4.10 |

-continued

| | |
|---|---|
| Overall optical length [mm] | 31.97 |
| BF(in air) [mm] | 3.64 |

Example 2

(1) Optical Configuration

Figure 3:
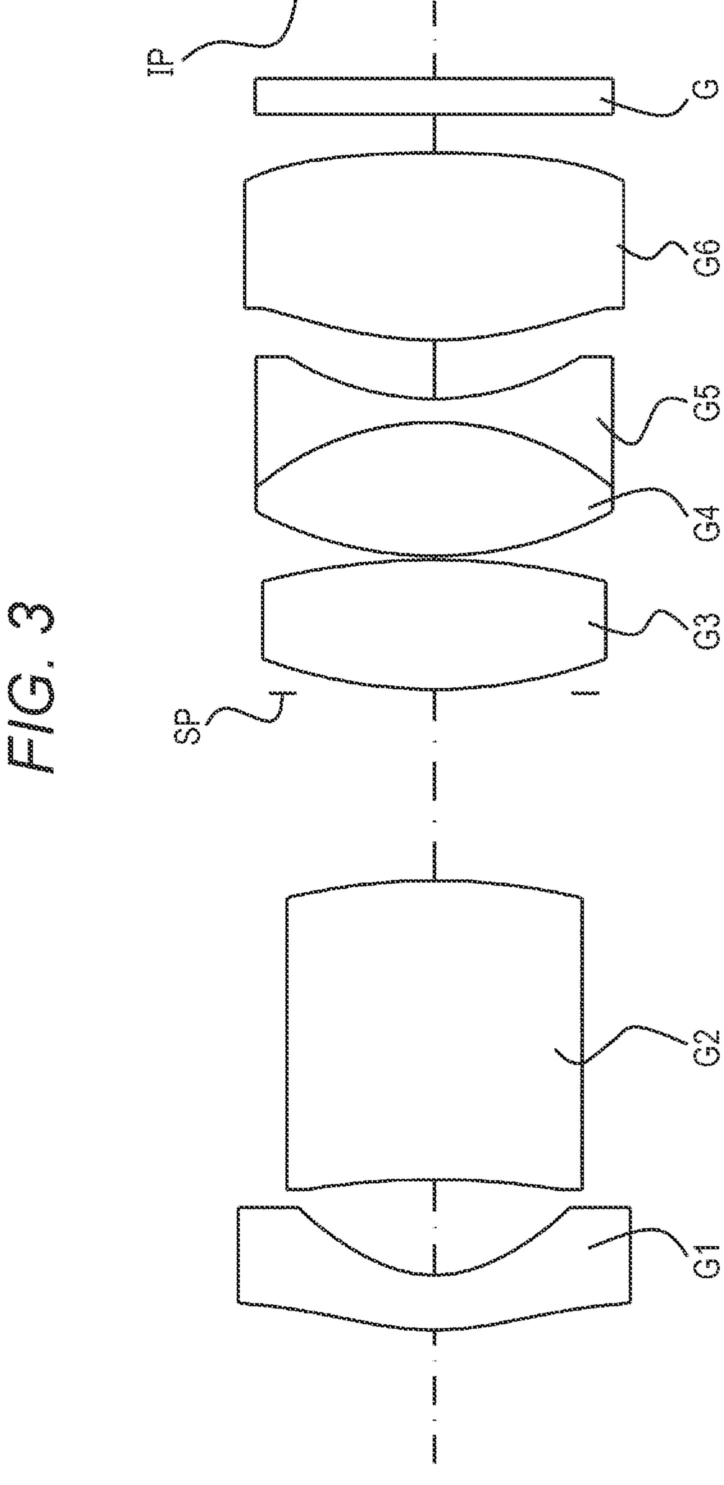
FIG. 3 is a lens cross-sectional view of an imaging lens according to Example 2 of the present invention.

FIG. 3 is a lens cross-sectional view of an imaging lens according to Example 2 of the present invention. As illustrated in FIG. 3, the imaging lens includes, in order from an object side to an image side, the first lens G1 including a negative meniscus lens having a convex shape facing the object, the second lens G2 including a positive meniscus lens having a convex shape facing the image, the third lens G3 including a biconvex lens, the cemented lens obtained by cementing the fourth lens G4 including a biconvex lens and the fifth lens G5 including a biconcave lens, and the sixth lens G6 including a biconvex lens. An aperture stop SP is disposed between the second lens G2 and the third lens G3. Both surfaces of the first lens G1 and both surfaces of the sixth lens G6 are aspherical.

(2) Numerical Examples

Figure 4:
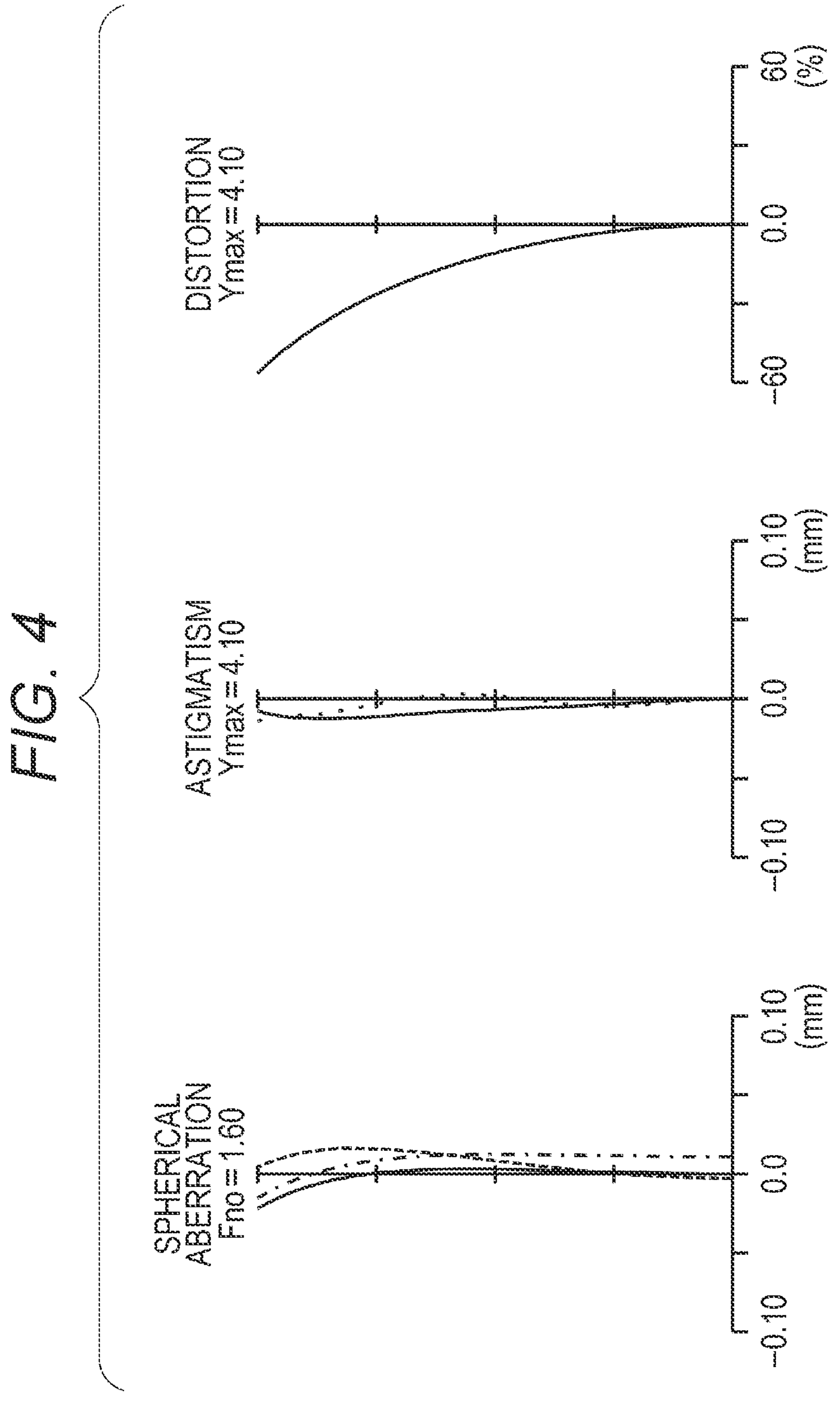
FIG. 4 is a spherical aberration diagram, an astigmatism diagram, and a distortion diagram of an imaging lens according to Example 2 in an infinite-distance object focusing state.

Next, numerical examples of the imaging lens will be described. Hereinafter, surface data, specifications, and aspherical coefficients of the imaging lens will be described. FIG. 4 is a longitudinal aberration diagram of the imaging lens in an infinite-distance object focusing state.

(Surface Data)

| Surface number | r | d | nd | νd |
|---|---|---|---|---|
| *1 | 7.000 | 1.400 | 1.8513 | 40.10 |
| *2 | 3.012 | 2.440 | | |
| 3 | −20.252 | 7.600 | 2.0027 | 19.32 |
| 4 | −16.238 | 4.761 | | |
| 5SP | INF | 0.100 | | |
| 6 | 12.597 | 3.300 | 1.7725 | 49.62 |
| 7 | −17.556 | 0.100 | | |
| 8 | 9.670 | 3.400 | 1.5935 | 67.00 |
| 9 | −7.014 | 0.600 | 1.8052 | 25.46 |
| 10 | 7.014 | 1.500 | | |
| *11 | 9.645 | 4.758 | 1.8014 | 45.45 |
| *12 | −32.307 | 0.500 | | |
| 13 | INE | 0.900 | 1.5168 | 64.20 |
| 14 | INF | 2.641 | | |

(Aspherical coefficient)

| Surface number | k | A4 | A6 | A8 | A10 |
|---|---|---|---|---|---|
| 1 | −8.6801E−01 | −3.3597E−03 | 9.4827E−05 | −1.6091E−06 | 1.2415E−08 |
| 2 | −2.2242E+00 | 1.7418E−03 | −9.8185E−05 | 7.7198E−06 | −1.4491E−07 |
| 11 | 0.0000E+00 | −4.8084E−04 | −2.9839E−06 | −2.2091E−07 | −5.3469E−09 |
| 12 | 0.0000E+00 | −3.7659E−04 | −9.9804E−06 | −7.8877E−08 | 0.0000E+00 |

(Specifications)

| | |
|---|---|
| Focal length [mm] | 4.590 |
| F number | 1.60 |
| Half Angle of View [°] | 63.96 |
| Image height [mm] | 4.10 |
| Overall optical length [mm] | 33.70 |
| BF(in air) [mm] | 3.74 |

Example 3

(1) Optical Configuration

Figure 5:
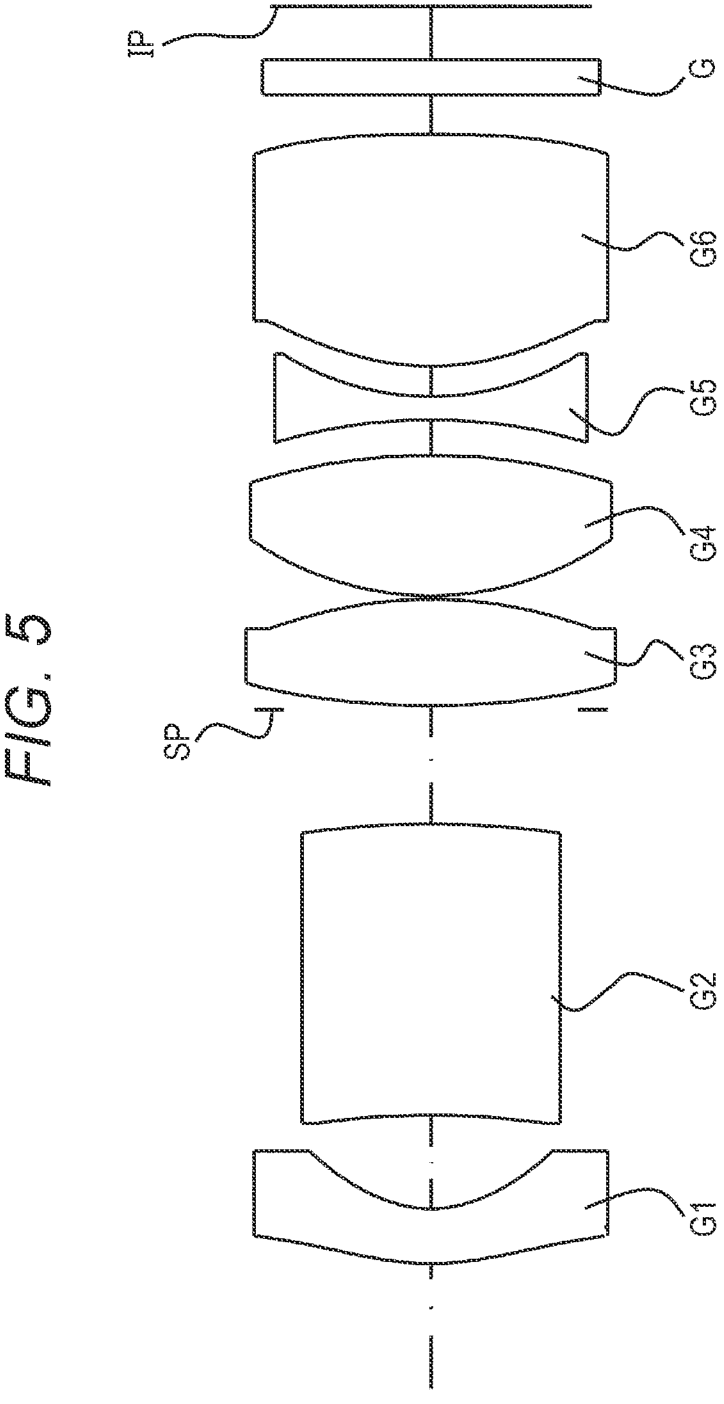
FIG. 5 is a lens cross-sectional view of an imaging lens according to Example 3 of the present invention.

FIG. 5 is a lens cross-sectional view of an imaging lens according to Example 3 of the present invention. As illustrated in FIG. 5, the imaging lens includes, in order from an object side to an image side, the first lens G1 including a negative meniscus lens having a convex shape facing the object, the second lens G2 including a positive meniscus lens having a convex shape facing the image, the third lens G3 including a biconvex lens, the fourth lens G4 including a biconvex lens, the fifth lens G5 including a biconcave lens, and the sixth lens G6 including a biconvex lens. An aperture stop SP is disposed between the second lens G2 and the third lens G3. Both surfaces of the first lens G1, both surfaces of the third lens G3, and both surfaces of the sixth lens G6 are aspherical.

(2) Numerical Examples

Figure 6:
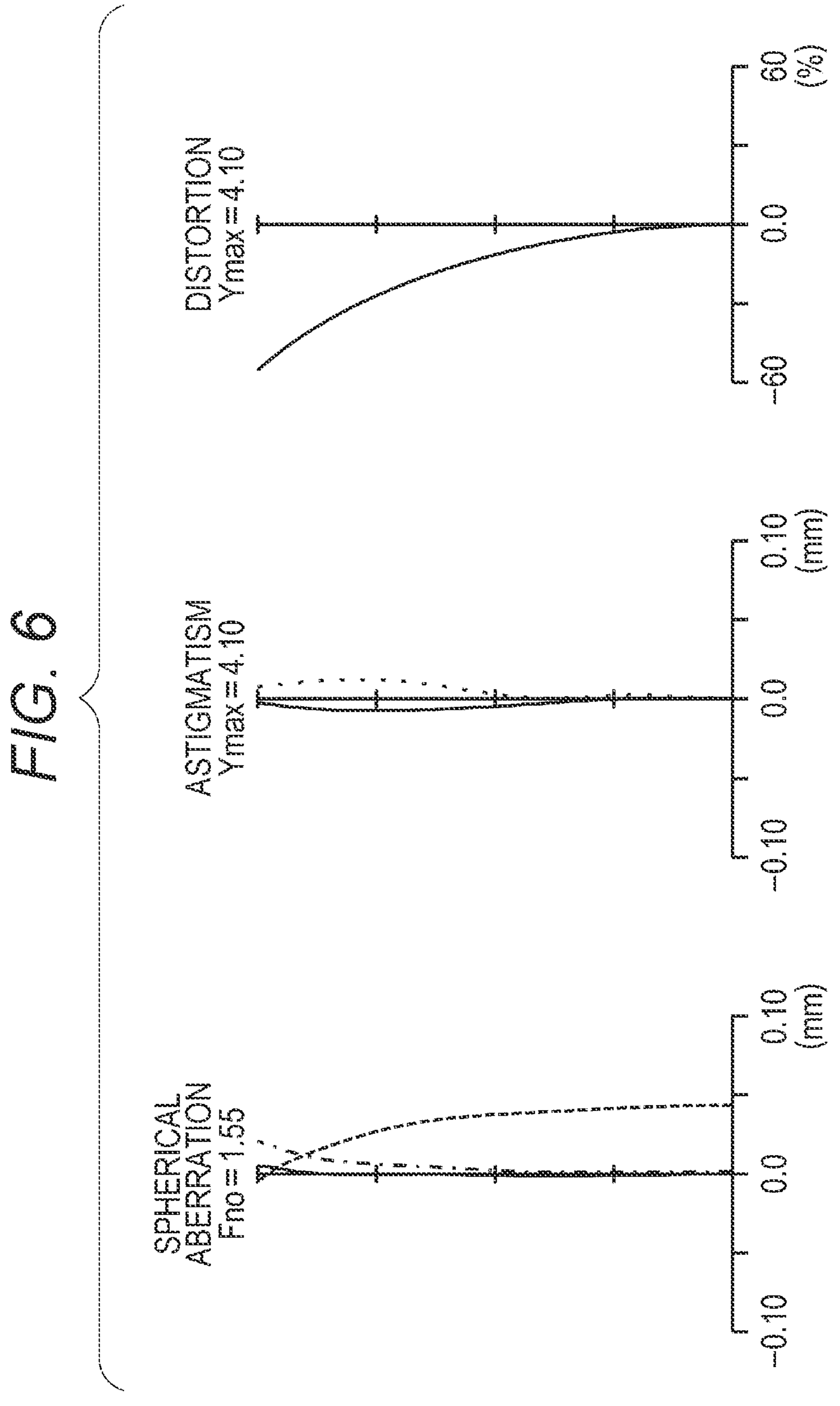
FIG. 6 is a spherical aberration diagram, an astigmatism diagram, and a distortion diagram of the imaging lens of Example 3 in an infinite-distance object focusing state.

Next, numerical examples of the imaging lens will be described. Hereinafter, surface data, specifications, and aspherical coefficients of the imaging lens will be described. FIG. 6 is a longitudinal aberration diagram of the imaging lens in an infinite-distance object focusing state.

(Surface Data)

| Surface number | r | d | nd | νd |
|---|---|---|---|---|
| *1 | 6.741 | 1.400 | 1.8513 | 40.10 |
| *2 | 3.012 | 2.385 | | |
| 3 | −19.887 | 7.400 | 2.0027 | 19.32 |
| 4 | −23.258 | 2.902 | | |
| 5SP | INF | 0.100 | | |
| *6 | 19.966 | 2.708 | 1.5920 | 67.02 |
| *7 | −11.336 | 0.100 | | |
| 8 | 8.098 | 3.572 | 1.5935 | 67.00 |
| 9 | −15.431 | 0.900 | | |
| 10 | −14.044 | 0.600 | 1.8052 | 25.46 |
| 11 | 7.157 | 0.767 | | |
| *12 | 6.649 | 5.913 | 1.5920 | 67.02 |
| *13 | −35.000 | 1.000 | | |
| 14 | INE | 0.900 | 1.5168 | 64.20 |
| 15 | INF | 1.353 | | |

(Aspherical coefficient)

| Surface number | K | A4 | A6 | A8 | A10 |
|---|---|---|---|---|---|
| 1 | −8.6801E−01 | −3.3597E−03 | 9.4827E−05 | −1.6091E−06 | 1.2415E−08 |
| 2 | −7.0897E−01 | −4.7007E−03 | 2.6465E−04 | −1.2626E−05 | 6.0586E−07 |
| 6 | 0.0000E+00 | −1.2629E−04 | 8.6053E−06 | −4.8485E−07 | 1.9725E−08 |
| 7 | 0.0000E+00 | −4.5683E−05 | 1.2583E−05 | −5.4880E−07 | 2.2685E−08 |
| 12 | 0.0000E+00 | −9.7503E−04 | 4.1493E−06 | −1.0449E−07 | −2.2723E−08 |
| 13 | 0.0000E+00 | −6.4047E−04 | 1.6607E−05 | −4.8448E−07 | −6.4796E−09 |

(Specifications)

| | |
|---|---|
| Focal length [mm] | 4.925 |
| F number | 1.55 |
| Half Angle of View [°] | 61.78 |
| Image height [mm] | 4.10 |
| Overall optical length [mm] | 31.69 |
| BF(in air) [mm] | 2.94 |

Example 4

(1) Optical Configuration

Figure 7:
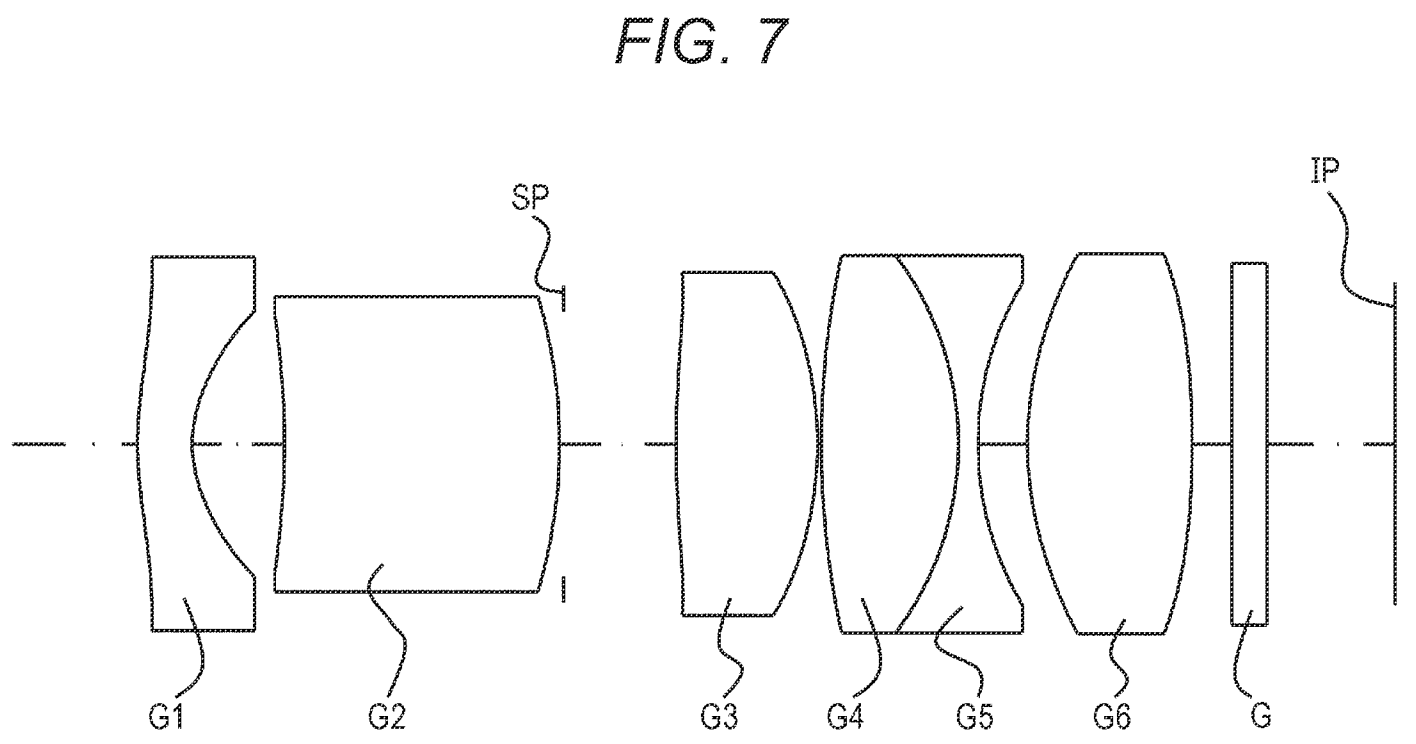

FIG. 7 is a lens cross-sectional view of an imaging lens of Example 4 according to the present invention. As illustrated in FIG. 7, the imaging lens includes, in order from an object side to an image side, the first lens G1 including a negative meniscus lens having a convex shape facing the object, the second lens G2 including a positive meniscus lens having a convex shape facing the image, the third lens G3 including a biconvex lens, a cemented lens obtained by cementing the fourth lens G4 including a biconvex lens and the fifth lens G5 including a biconcave lens, and the sixth lens G6 including a biconvex lens. An aperture stop SP is disposed between the second lens G2 and the third lens G3. Both surfaces of the first lens G1, both surfaces of the third lens G3, and both surfaces of the sixth lens G6 are aspherical.

(2) Numerical Examples

Figure 8:
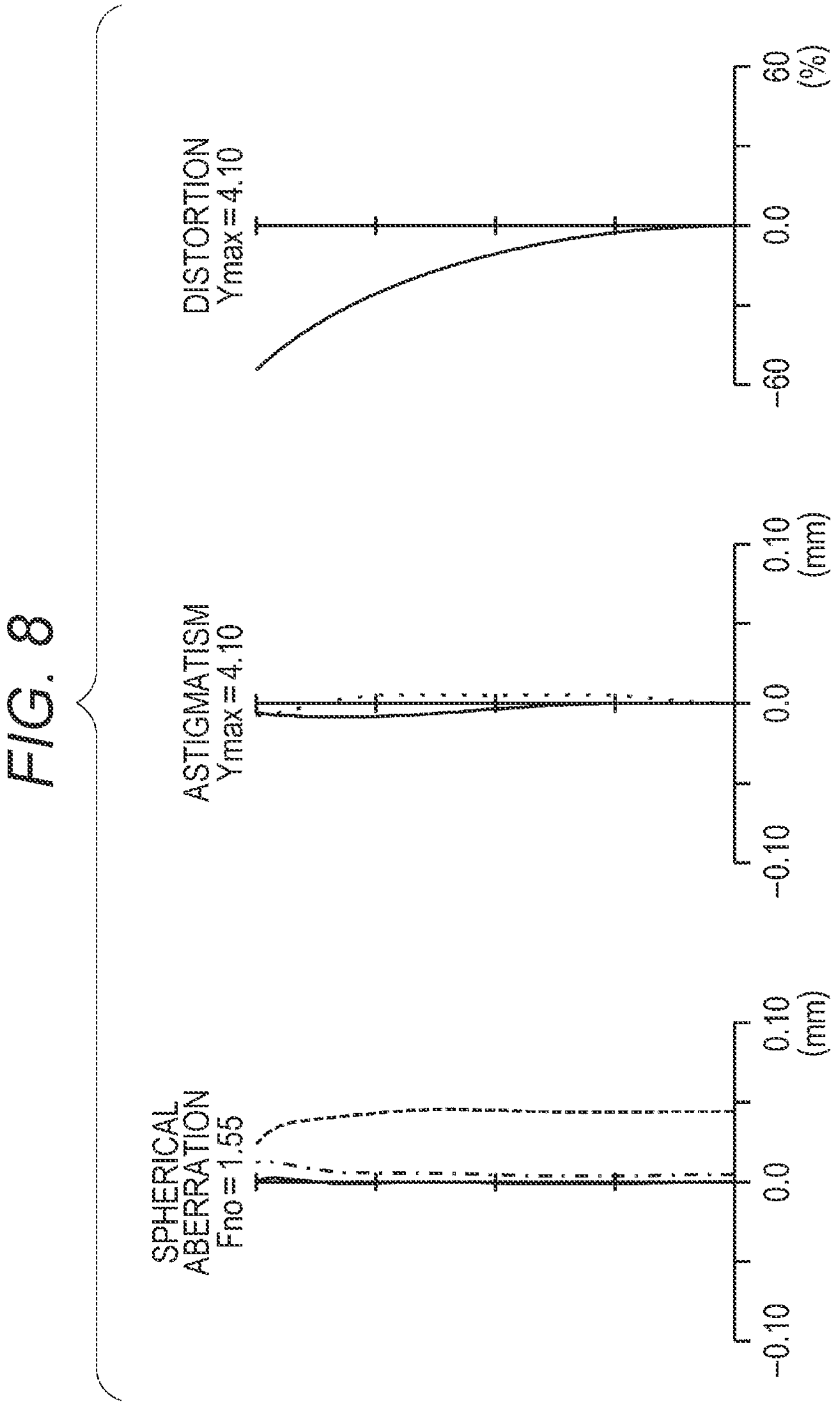
FIG. 8 is a spherical aberration diagram, an astigmatism diagram, and a distortion diagram of the imaging lens of Example 4 in an infinite-distance object focusing state.

Next, numerical examples of the imaging lens will be described. Hereinafter, surface data, specifications, and aspherical coefficients of the imaging lens will be described. FIG. 8 is a longitudinal aberration diagram of the imaging lens in an infinite-distance object focusing state.

(Surface Data)

| Surface number | r | d | nd | νd |
|---|---|---|---|---|
| *1 | 9.000 | 1.400 | 1.8513 | 40.10 |
| *2 | 3.304 | 2.339 | | |
| 3 | −22.000 | 7.000 | 2.0027 | 19.32 |
| 4 | −13.046 | 0.100 | | |
| 5SP | INF | 2.854 | | |
| *6 | 25.120 | 3.600 | 1.7680 | 49.24 |
| *7 | −9.572 | 0.100 | | |
| 8 | 22.752 | 3.495 | 1.6968 | 55.46 |
| 9 | −8.000 | 0.500 | 1.7521 | 25.05 |
| 10 | 8.000 | 1.256 | | |
| *11 | 8.806 | 4.200 | 1.5533 | 71.68 |
| *12 | −25.000 | 1.000 | | |
| 13 | INF | 0.900 | 1.5168 | 64.20 |
| 14 | INF | 3.256 | | |

(Aspherical coefficient)

| Surface number | K | A4 | A6 | A8 | A10 |
|---|---|---|---|---|---|
| 1 | −4.8953E+00 | −2.6922E−03 | 9.6327E−05 | −1.9024E−06 | 1.6908E−08 |
| 2 | −2.1446E+00 | 7.1566E−04 | 2.8804E−05 | 2.3932E−06 | 1.8157E−08 |
| 6 | 0.0000E+00 | −3.6746E−04 | −1.1228E−05 | 3.4848E−07 | −2.4517E−08 |
| 7 | 0.0000E+00 | −6.0326E−05 | −5.6966E−06 | 1.3673E−07 | −1.0471E−08 |
| 11 | −1.2528E−01 | −3.1689E−04 | 1.6429E−06 | −6.8284E−08 | 3.6477E−09 |
| 12 | 0.0000E+00 | −5.0773E−04 | 3.0305E−06 | −1.5800E−07 | 5.3249E−09 |

(Specifications)

| | |
|---|---|
| Focal length [mm] | 5.008 |
| F number | 1.55 |
| Half Angle of View [°] | 60.90 |
| Image height [mm] | 4.10 |
| Overall optical length [mm] | 31.69 |
| BF(in air) [mm] | 4.85 |

Example 5

(1) Optical Configuration

Figure 9:
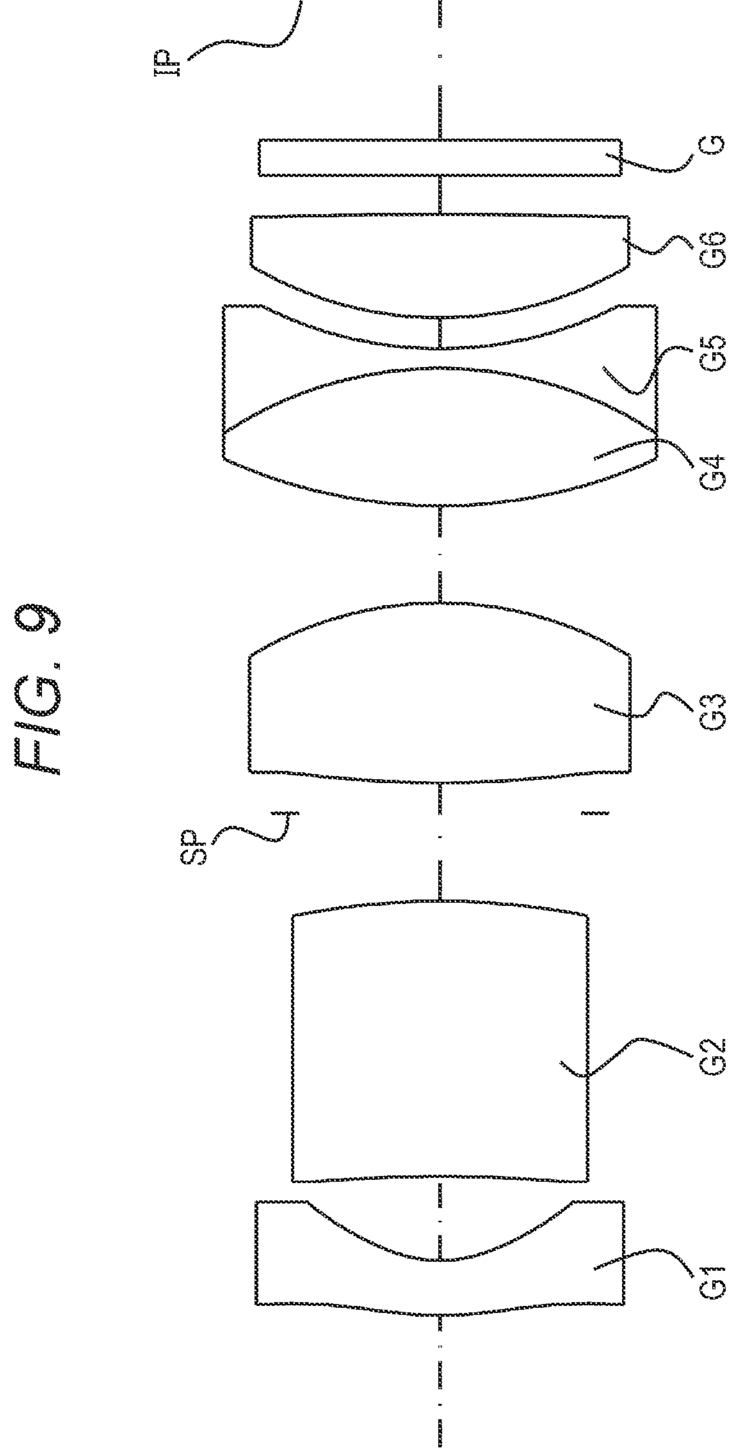
FIG. 9 is a lens cross-sectional view of an imaging lens according to Example 5 of the present invention.

FIG. 9 is a lens cross-sectional view of an imaging lens according to Example 5 of the present invention. As illustrated in FIG. 9, the imaging lens includes, in order from an object side to an image side, the first lens G1 including a negative meniscus lens having a convex shape facing the object, the second lens G2 including a positive meniscus lens having a convex shape facing the image, the third lens G3 including a biconvex lens, the cemented lens obtained by cementing the fourth lens G4 including a biconvex lens and the fifth lens G5 including a biconcave lens, and the sixth lens G6 including a biconvex lens. An aperture stop SP is disposed between the second lens G2 and the third lens G3. Both surfaces of the first lens G1 and both surfaces of the third lens G3 are aspherical.

(2) Numerical Examples

Figure 10:
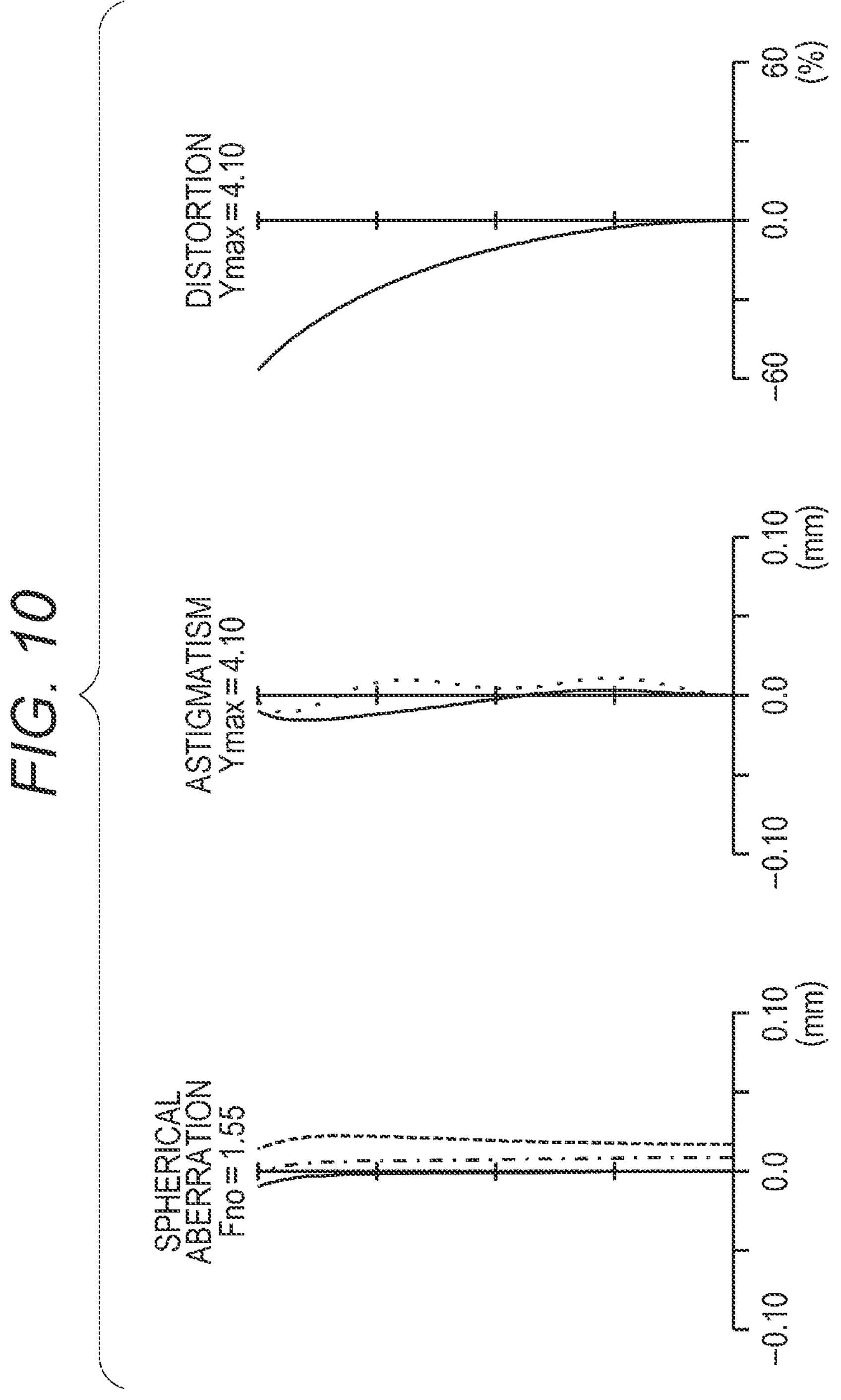
FIG. 10 is a spherical aberration diagram, an astigmatism diagram, and a distortion diagram of the imaging lens of Example 5 in an infinite-distance object focusing state.

Next, numerical examples of the imaging lens will be described. Hereinafter, surface data, specifications, and aspherical coefficients of the imaging lens will be described. FIG. 10 is a longitudinal aberration diagram of the imaging lens in an infinite-distance object focusing state.

(surface Data)

| Surface number | r | d | nd | νd |
|---|---|---|---|---|
| *1 | 8.340 | 1.400 | 1.8513 | 40.10 |
| *2 | 3.120 | 2.141 | | |
| 3 | −37.798 | 7.000 | 1.9037 | 31.31 |
| 4 | −19.176 | 2.243 | | |
| 5SP | INF | 0.759 | | |
| *6 | 24.300 | 4.586 | 1.6188 | 63.86 |
| *7 | −9.138 | 2.476 | | |
| 8 | 13.248 | 3.500 | 1.6968 | 55.46 |
| 9 | −10.000 | 0.500 | 1.7521 | 25.05 |
| 10 | 10.000 | 0.786 | | |
| 11 | 9.357 | 2.630 | 1.6180 | 63.40 |
| 12 | −184.000 | 1.000 | | |
| 13 | INF | 0.900 | 1.5168 | 64.20 |
| 14 | INF | 3.676 | | |

(Aspherical coefficient)

| Surface number | K | A4 | A6 | A8 | A10 |
|---|---|---|---|---|---|
| 1 | −1.4917E−01 | −4.7069E−03 | 1.7542E−04 | −4.0871E−06 | 4.2379E−08 |
| 2 | −1.2756E+00 | −4.4118E−03 | 3.4115E−04 | −1.1706E−05 | 2.5041E−07 |
| 6 | 0.0000E+00 | −2.1384E−04 | −3.6834E−07 | −1.1474E−07 | −2.0835E−10 |
| 7 | 1.1041E−01 | 8.8623E−05 | 8.6401E−07 | −7.8167E−08 | 1.0670E−11 |

(Specifications)

| | |
|---|---|
| Focal length [mm] | 5.012 |
| F number | 1.55 |
| Half Angle of View [°] | 62.07 |
| Image height [mm] | 4.10 |
| Overall optical length [mm] | 33.29 |
| BF(in air) [mm] | 5.27 |

Example 6

(1) Optical Configuration

Figure 11:
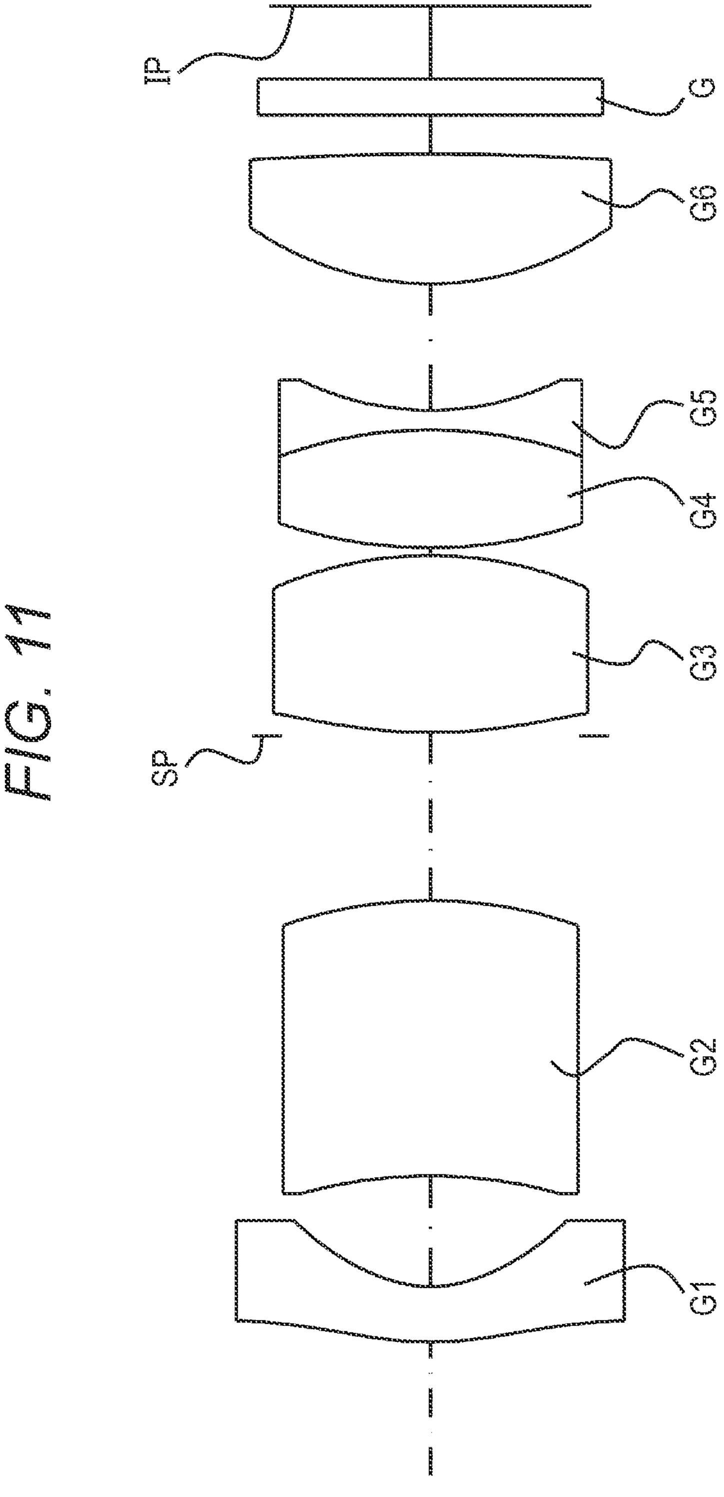
FIG. 11 is a lens cross-sectional view of an imaging lens of Example 6 of the present invention.

FIG. 11 is a lens cross-sectional view of an imaging lens of Example 6 according to the present invention. As illustrated in FIG. 11, the imaging lens includes, in order from an object side to an image side, the first lens G1 including a negative meniscus lens having a convex shape facing the object side, the second lens G2 including a positive meniscus lens having a convex shape facing the image, the third lens G3 including a biconvex lens, the cemented lens obtained by cementing the fourth lens G4 including a biconvex lens and the fifth lens G5 including a biconcave lens, and the sixth lens G6 including a biconvex lens. An aperture stop SP is disposed between the second lens G2 and the third lens G3. Both surfaces of the first lens G1 and both surfaces of the third lens G3 are aspherical.

(2) Numerical Examples

Figure 12:
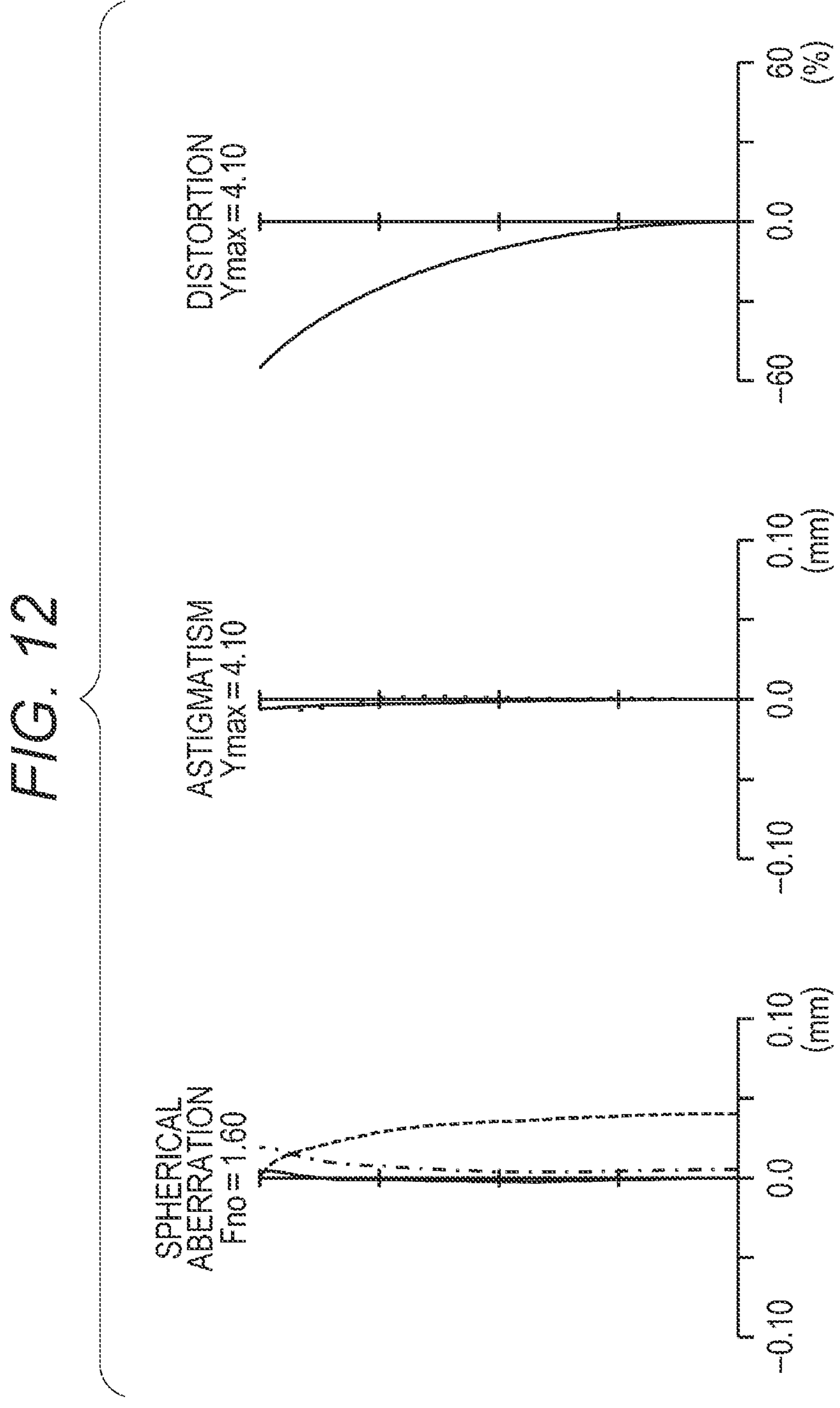
FIG. 12 is a spherical aberration diagram, an astigmatism diagram, and a distortion diagram of the imaging lens of Example 6 in an infinite-distance object focusing state.

Next, numerical examples of the imaging lens will be described. Hereinafter, surface data, specifications, and aspherical coefficients of the imaging lens will be described. FIG. 12 is a longitudinal aberration diagram of the imaging lens in an infinite-distance object focusing state.

(Surface Data)

| Surface number | r | d | nd | νd |
|---|---|---|---|---|
| *1 | 8.102 | 1.420 | 1.8513 | 40.10 |
| *2 | 3.249 | 2.812 | | |
| 3 | −12.347 | 7.000 | 1.9537 | 32.32 |
| 4 | −11.511 | 4.175 | | |
| 5SP | INF | 0.100 | | |
| *6 | 13.670 | 4.500 | 1.6935 | 53.20 |
| *7 | −10.116 | 0.200 | | |
| 8 | 12.273 | 3.000 | 1.5935 | 67.00 |
| 9 | −11.251 | 0.500 | 1.8467 | 23.78 |
| 10 | 7.500 | 3.221 | | |
| 11 | 8.000 | 3.300 | 1.5920 | 67.02 |
| 12 | −76.113 | 1.000 | | |
| 13 | INF | 0.900 | 1.5168 | 64.20 |
| 14 | INF | 1.872 | | |

(Aspherical coefficient)

| Surface number | K | A4 | A6 | A8 | A10 |
|---|---|---|---|---|---|
| 1 | −1.1519E−01 | −3.1688E−03 | 8.3418E−05 | −1.5241E−06 | 1.2002E−08 |
| 2 | −2.2619E+00 | 1.6445E−03 | −6.9159E−05 | 7.3561E−06 | −1.8109E−07 |
| 6 | −1.4012E+01 | 3.9873E−04 | −2.5806E−05 | 5.9536E−07 | −2.1424E−08 |
| 7 | 2.2187E+00 | 3.2120E−04 | 3.7711E−06 | −1.9164E−07 | 7.9998E−09 |

(Specifications)

| | |
|---|---|
| Focal length [mm] | 4.865 |
| F number | 1.60 |
| Half Angle of View [°] | 62.00 |
| Image height [mm] | 4.10 |
| Overall optical length [mm] | 33.69 |
| BF(in air) [mm] | 3.47 |

TABLE 1

| | Example 1 | Example 2 | Example 3 | Example 4 | Example 5 | Example 6 |
|---|---|---|---|---|---|---|
| (1) D2/f | 1.516 | 1.656 | 1.503 | 1.398 | 1.397 | 1.439 |
| (2) f12/f | −3.301 | −2.948 | −1.910 | −3.393 | −2.223 | −3.523 |
| (3) D1/f | 0.277 | 0.305 | 0.284 | 0.280 | 0.279 | 0.292 |
| (4) d1-2/f | 0.396 | 0.532 | 0.484 | 0.467 | 0.427 | 0.578 |
| (5) R11/f | 1.612 | 1.525 | 1.369 | 1.797 | 1.664 | 1.666 |
| (6) D3/f | 0.725 | 0.719 | 0.550 | 0.719 | 0.915 | 0.925 |
| (7) d5-6/f | 0.352 | 0.327 | 0.156 | 0.251 | 0.157 | 0.662 |
| (8) TTL/f | 6.244 | 7.342 | 6.435 | 6.328 | 6.642 | 6.926 |
| (9) BF/f | 0.711 | 0.815 | 0.598 | 0.968 | 1.051 | 0.712 |
| (10) FOV | 123.88 | 127.92 | 123.56 | 121.80 | 124.14 | 124.00 |
| (11) ν3 | 63.85 | 49.62 | 67.02 | 49.24 | 63.85 | 53.20 |
| (12) f3/f | 1.638 | 2.172 | 2.562 | 1.887 | 2.259 | 1.868 |
| (13)* | −0.573 | −0.564 | −0.553 | −0.544 | −0.566 | −0.552 |
| (14) f45/f | −2.169 | −3.443 | −11.264 | −3.155 | −10.864 | −2.783 |

*Expression (13) is $(Y_{max} - f \times \tan\theta)/(f \times \tan\theta)$ as described above.

SUMMARY

An imaging lens according to a first aspect of the present invention includes, in order from an object side to an image side, a first lens including a negative meniscus lens having a convex shape facing the object, a second lens including a positive meniscus lens having a convex shape facing the image, at least one lens including a third lens, a fourth lens, a fifth lens, and a sixth lens including a positive lens whose image side surface is a convex surface, wherein Expression (1) is satisfied as follows:

$$1.2 < D_2/f \quad (1)$$

where $D_2$ is a thickness of the second lens on the optical axis, and f is a focal length of the imaging lens.

An imaging lens according to a second aspect of the present invention may satisfy Expression (2) in the first aspect:

$$-10.0 < f_{12}/f < 0 \quad (2)$$

where $f_{12}$ is a composite focal length of the first lens and the second lens.

An imaging lens according to a third aspect of the present invention may satisfy Expression (3) in the first aspect or the second aspect:

$$0.05 < D_1/f < 0.6 \quad (3)$$

where $D_1$ is a thickness of the first lens on the optical axis.

An imaging lens according to a fourth aspect of the present invention may satisfy Expression (4) in any one of the first to third aspects:

$$0.1 < d_{1-2}/f < 2.0 \quad (4)$$

where $d_{1-2}$ is an air distance between the first lens and the second lens on the optical axis.

In an imaging lens according to a fifth aspect of the present invention, the first lens may have at least one aspherical face in any one of the first to fourth aspects.

An imaging lens according to a sixth aspect of the present invention may satisfy Expression (5) in any one of the first to fifth aspects:

$$0.5 < R_{11}/f < 10.0 \quad (5)$$

where $R_{11}$ is a paraxial curvature radius of the object side surface of the first lens.

An imaging lens according to a seventh aspect of the present invention may satisfy Expression (6) in any one of the first to sixth aspects:

$$0.25 < D_3/f < 2.0 \quad (6)$$

where $D_3$ is a thickness of the third lens on the optical axis.

An imaging lens according to an eighth aspect of the present invention may satisfy Expression (7) in any one of the first to seventh aspects:

$$0 < d_{5-6}/f < 1.5 \quad (7)$$

where $d_{5-6}$ is an air distance between the fifth lens and the sixth lens on the optical axis.

An imaging lens according to a ninth aspect of the present invention may satisfy Expression (8) in any one of the first to eighth aspects:

$$2.0 < TTL/f < 10.0 \quad (8)$$

where

TTL is a distance on an optical axis from an object side surface of the first lens to an image plane, and a value converted into air is used as the distance from the sixth lens to the image plane on the optical axis.

An imaging lens according to a tenth aspect of the present invention may satisfy Expression (9) in any one of the first to ninth aspects:

$$0.2 < BF/f < 2.0 \quad (9)$$

where

BF is a distance converted into air from the image side surface of the sixth lens to the image plane on the optical axis.

An imaging lens according to an eleventh aspect of the present invention may satisfy Expression (10) in any one of the first to tenth aspects:

$$90° < FOV \quad (10)$$

where

FOV is an angle of view of the imaging lens.

An imaging lens according to a twelfth aspect of the present invention may satisfy Expression (11) in any one of the first to eleventh aspects:

$$40 < \nu_3 \quad (11)$$

where $\nu_3$ is an Abbe number of the third lens with respect to d Line.

An imaging lens according to a thirteenth aspect of the present invention may satisfy Expression (12) in any one of the first to twelfth aspects:

$$1.0 < f_3/f < 5.0 \quad (12)$$

where $f_3$ is a focal length of the third lens.

An imaging lens according to a fourteenth aspect of the present invention may satisfy Expression (13) in any one of the first to thirteenth aspects:

$$(Y_{max} - f \times \tan\theta)/(f \times \tan\theta) < -0.3 \quad (13)$$

where $Y_{max}$ is an image height in an effective image circle, and

θ is a half angle of view in the effective image circle.

In an imaging lens according to a fifteenth aspect of the present invention, the fourth lens includes a positive lens, and the fifth lens includes a negative lens according to any one of the first to fourteenth aspects, and Expression (14) may be satisfied as follows:

$$f_{45}/f < -1.0 \quad (14)$$

where $f_{45}$ is a composite focal length of the fourth lens and the fifth lens.

In an imaging lens according to a sixteenth aspect of the present invention, all lenses from the first lens to the sixth lens may be made of glass in any one of the first to fifteenth aspects.

An imaging apparatus according to a seventeenth aspect of the present invention includes the imaging lens according to any one of the first to sixteenth aspects; and an image sensor that converts an optical image formed by the imaging lens into an electrical signal.

The imaging lens and the imaging apparatus described in the above embodiments and examples are an aspect of the imaging lens and the imaging apparatus according to the present invention, and correspond to the imaging lens according to the first to sixteenth aspects and the imaging apparatus according to the seventeenth aspect. According to the imaging lens and the imaging apparatus of each aspect described above, operational effects similar to the operational effects described in the above embodiments and examples are obtained. The imaging lens and the imaging apparatus according to the present invention are not limited to the imaging lens and the imaging apparatus described in the embodiments and the examples, and can be appropriately changed within the scope of the imaging lens and the imaging apparatus of each aspect described above.

According to the present invention, it is possible to provide an imaging lens and an imaging apparatus that are bright, have a wide imaging range, and have high imaging performance while achieving overall miniaturization.

What is claimed is:

1. An imaging lens comprising: sequentially from an object side to an image side, a first lens including a negative meniscus lens having a convex shape directed to the object side; a second lens consisting of a single positive meniscus lens having a convex shape directed to the image side; at least one lens including a third lens; a fourth lens; a fifth lens; and a sixth lens including a positive lens having a convex surface as an image-side surface, wherein Expression (1) is satisfied as follows:

$$1.2 < D_2/f \quad (1)$$

where $D_2$ is a thickness of the second lens on an optical axis, and f is a focal length of the imaging lens.

2. The imaging lens according to claim 1, wherein Expression (2) is satisfied as follows:

$$-10.0 < f_{12}/f < 0 \quad (2)$$

where $f_{12}$ is a composite focal length of the first lens and the second lens.

3. The imaging lens according to claim 1, wherein Expression (3) is satisfied as follows:

$$0.05 < D_1/f < 0.6 \quad (3)$$

where $D_1$ is a thickness of the first lens on the optical axis.

4. The imaging lens according to claim 1, wherein Expression (4) is satisfied as follows:

$$0.1 < d_{1-2}/f < 2.0 \quad (4)$$

where $d_{1-2}$ is an air distance between the first lens and the second lens on the optical axis.

5. The imaging lens according to claim 1, wherein the first lens has at least one aspherical face.

6. The imaging lens according to claim 1, wherein Expression (5) is satisfied as follows:

$$0.5 < R_{11}/f < 10.0 \quad (5)$$

where $R_{11}$ is a paraxial curvature radius of an object side surface of the first lens.

7. The imaging lens according to claim 1, wherein Expression (6) is satisfied as follows:

$$0.25 < D_3/f < 2.0 \quad (6)$$

where $D_3$ is a thickness of the third lens on the optical axis.

8. The imaging lens according to claim 1, wherein Expression (7) is satisfied as follows:

$$0 < d_{5-6}/f < 1.5 \tag{7}$$

where $d_{5-6}$ is an air distance between the fifth lens and the sixth lens on the optical axis.

9. The imaging lens according to claim 1, wherein Expression (8) is satisfied as follows:

$$2.0 < TTL/f < 10.0 \tag{8}$$

where

TTL is a distance from an object side surface of the first lens to an image plane on the optical axis, and a value converted into air is used as a distance from the sixth lens to the image plane on the optical axis.

10. The imaging lens according to claim 1, wherein Expression (9) is satisfied as follows:

$$0.2 < BF/f < 2.0 \tag{9}$$

where

BF is a distance converted into air from an image side surface of the sixth lens to the image plane on the optical axis.

11. The imaging lens according to claim 1, wherein Expression (10) is satisfied as follows:

$$90° < FOV \tag{10}$$

where

FOV is an angle of view of the imaging lens.

12. The imaging lens according to claim 1, wherein Expression (11) is satisfied as follows:

$$40 < v_3 \tag{11}$$

where $v_3$ is an Abbe number of the third lens with respect to d Line.

13. The imaging lens according to claim 1, wherein Expression (12) is satisfied as follows:

$$1.0 < f_3/f < 5.0 \tag{12}$$

where $f_3$ is a focal length of the third lens.

14. The imaging lens according to claim 1, wherein Expression (13) is satisfied as follows:

$$(Y_{max} - f \times \tan\theta)/(f \times \tan\theta) < -0.3 \tag{13}$$

where $Y_{max}$ is an image height in an effective image circle, and $\theta$ is a half angle of view in the effective image circle.

15. The imaging lens according to claim 1, wherein the fourth lens includes a positive lens, and the fifth lens includes a negative lens, and wherein Expression (14) is satisfied as follows:

$$f_{45}/f < -1.0 \tag{14}$$

where $f_{45}$ is a composite focal length of the fourth lens and the fifth lens.

16. The imaging lens according to claim 1, wherein all lenses from the first lens to the sixth lens are made of glass.

17. An imaging apparatus comprising: the imaging lens according to claim 1; and an image sensor that converts an optical image formed by the imaging lens into an electrical signal.

* * * * *